(12) United States Patent
Ota et al.

(10) Patent No.: US 7,289,881 B2
(45) Date of Patent: Oct. 30, 2007

(54) INFORMATION COLLECTION APPARATUS, INFORMATION COLLECTION METHOD, INFORMATION COLLECTION PROGRAM, RECORDING MEDIUM CONTAINING INFORMATION COLLECTION PROGRAM, AND INFORMATION COLLECTION SYSTEM

(75) Inventors: Shunji Ota, Kyoto (JP); Masayuki Oyagi, Kyoto (JP); Masaki Yamato, Kyoto (JP)

(73) Assignee: Omron Corporation (JP)

( * ) Notice: Subject to any disclaimer, the term of this patent is extended or adjusted under 35 U.S.C. 154(b) by 779 days.

(21) Appl. No.: 10/485,511

(22) PCT Filed: Aug. 2, 2002

(86) PCT No.: PCT/JP02/07938

§ 371 (c)(1),
(2), (4) Date: Feb. 2, 2004

(87) PCT Pub. No.: WO03/015048

PCT Pub. Date: Feb. 20, 2003

(65) Prior Publication Data

US 2004/0236466 A1    Nov. 25, 2004

(30) Foreign Application Priority Data

Aug. 7, 2001  (JP)  ............................. 2001-239904

(51) Int. Cl.
*G06F 19/00* (2006.01)

(52) U.S. Cl. .................. 700/245; 700/247; 700/258; 700/259; 340/521; 340/522; 340/531; 340/539.1; 340/539.22; 379/37; 379/42; 901/1

(58) Field of Classification Search .............. 700/245, 700/247, 258, 259; 340/521, 522, 531, 539.1, 340/539.22, 539.26; 901/1; 379/42
See application file for complete search history.

(56) References Cited

U.S. PATENT DOCUMENTS 5,446,445 A    8/1995   Bloomfield et al.

(Continued)

FOREIGN PATENT DOCUMENTS

EP    1 122 038 A1   8/2001

(Continued)

OTHER PUBLICATIONS

Funabiki et al., Binocular-vision-based position sensor with PSDs and its application to mobile robot following, IEEE, 2002, p. 79-84.*

(Continued)

*Primary Examiner*—Thomas Black
*Assistant Examiner*—Marc McDieunel
(74) *Attorney, Agent, or Firm*—Dickstein Shapiro LLP

(57) ABSTRACT

A robot includes a robot sensor for sensing abnormality around the robot, a moving portion for moving the robot main body, and a movement control unit for controlling the moving portion so that the robot main body is moved to a destination determined according to the information sensed by a fixed-position sensor fixed to a predetermined position outside the robot. The moving destination may be determined by the total control unit of the robot main body according to the information from the fixed-position sensors or by a center communicating with the robot according to the information from the fixed-position sensors. Since abnormality is sensed by the fixed-position sensors together with the robot sensor, the fixed-position sensors may have low accuracy obtained at a low cost. That is, by reducing the cost required for collecting external information, such as by the fixed-position sensor, it is possible to provide a monitoring system capable of collecting ambient information (such as abnormality information) without lowering the accuracy.

19 Claims, 17 Drawing Sheets

U.S. PATENT DOCUMENTS

| | | | | |
|---|---|---|---|---|
| 5,935,179 | A | * | 8/1999 | Kleiner et al. ................. 701/23 |
| 6,785,619 | B1 | * | 8/2004 | Homann et al. ............... 702/51 |
| 7,030,757 | B2 | * | 4/2006 | Matsuhira et al. .......... 340/541 |

FOREIGN PATENT DOCUMENTS

| | | |
|---|---|---|
| JP | 51-048998 | 4/1976 |
| JP | 59-195786 | 11/1984 |
| JP | 60-63698 | 4/1985 |
| JP | 5-159187 | 6/1993 |
| JP | 08-180281 | 7/1996 |
| JP | 08-276027 | 10/1996 |
| JP | 10-172078 | 6/1998 |
| JP | 11-283152 | 10/1999 |
| WO | WO 99/67067 | 12/1999 |

OTHER PUBLICATIONS

Japanese Office Action—Notice of Reason for Refusal with English Translation, dated Aug. 1, 2006.

* cited by examiner

FIG. 3

| SENSING OBJECTS \ FIXED-POSITION SENSORS | SOUND SENSOR | VIBRATION SENSOR | THERMAL SOURCE SENSOR | MOVING OBJECT SENSOR | SMOKE SENSOR | LIGHT SENSOR | AIR PRESSURE SENSOR | TEMPERATURE SENSOR | OPENING/ CLOSING SENSOR | GAS SENSOR |
|---|---|---|---|---|---|---|---|---|---|---|
| PERSON (SUSPICIOUS PERSON) | ○ | ○ | ◎ | ◎ | | △ | △ | | | |
| PERSON (LYING PERSON) | △ | | ◎ | | | | | | ◎ | |
| ANIMAL | ○ | ○ | ◎ | ◎ | | | | | | |
| FIRE | △ | | ◎ | | ◎ | | | ◎ | | |
| OVERHEATING OF MACHINERY AND OTHER EQUIPMENT | | | ◎ | | | | | ○ | | |
| EXPLOSION | ◎ | ◎ | ○ | | △ | ○ | ○ | | | |
| BREAKING OF GLASSES | ○ | | | | | | ○ | | | |
| PARTIAL DAMAGE AND OTHER DAMAGE TO BUILDING | ○ | ○ | | | | | | | △ | |
| FALLING OF EQUIPMENT AND MACHINERY | ○ | ○ | | | | | | | | |
| GAS LEAKAGE | | | | | | | △ | | | ◎ |

◎ : MOST SENSITIVE
○ : MORE SENSITIVE
△ : SENSITIVE

FIG. 4

| SENSING OBJECTS \ MOVING SENSORS | IMAGE SENSOR | ACOUSTIC SENSOR | THERMAL SOURCE | TEMPERATURE SENSOR | GAS SENSOR |
|---|---|---|---|---|---|
| PERSON (SUSPICIOUS PERSON) | SENSING OF MOVING OBJECT ABOUT THE SIZE OF HUMAN | SENSING OF HUMAN VOICE | THERMAL SOURCE WITH TEMPERATURE NEAR BODY TEMPERATURE (36°C) | | |
| PERSON (LYING PERSON) | SENSING OF STATIONARY OBJECT ABOUT THE SIZE OF HUMAN | SENSING OF HUMAN VOICE | THERMAL SOURCE WITH TEMPERATURE NEAR BODY TEMPERATURE (36°C) | | |
| ANIMAL | SENSING OF MOVING OBJECT SMALLER THAN HUMAN | SENSING OF ANIMAL VOICE | THERMAL SOURCE WITH TEMPERATURE NEAR BODY TEMPERATURE (36°C) | | |
| FIRE | SENSING OF FIRE | SENSING OF BURNING SOUND | THERMAL SOURCE WITH TEMPERATURE HIGHER THAN ORDINARY TEMPERATURE (EX. 50°C OR HIGHER) | TEMPERATURE HIGHER THAN USUAL (EX. 50°C OR HIGHER) | SENSING OF GAS CAUSED BY BURNING (CARBON DIOXIDE, ETC.) |
| OVERHEATING OF MACHINERY AND OTHER EQUIPMENT | | | THERMAL SOURCE WITH TEMPERATURE HIGHER THAN ORDINARY TEMPERATURE (EX. 50°C OR HIGHER) | TEMPERATURE HIGHER THAN USUAL (EX. 50°C OR HIGHER) | |
| EXPLOSION | | | THERMAL SOURCE WITH TEMPERATURE HIGHER THAN ORDINARY TEMPERATURE (EX. 50°C OR HIGHER) | TEMPERATURE HIGHER THAN USUAL (EX. 50°C OR HIGHER) | |
| BREAKING OF GLASSES | SENSING OF SCATTERED BROKEN PIECES OF GLASS | | | | |
| DAMAGE TO BUILDING | SENSING OF OBJECT AT A DIFFERENT PLACE FROM A PLACE WHERE THE OBJECT IS NORMALLY PLACED SENSING OF SCATTERED BROKEN PIECES OF OBJECT | | | | |
| FALLING OF EQUIPMENT AND MACHINERY | SENSING OF OBJECT AT A DIFFERENT PLACE FROM A PLACE WHERE THE OBJECT IS NORMALLY PLACED | | | | |
| GAS LEAKAGE | | SENSING OF SOUND OF BLOWING GAS | | | SENSING OF GAS |

● SOUND SENSOR
▲ THERMAL SOURCE SENSOR
■ VIBRATION SENSOR
★ MOVING BODY SENSOR
✺ OPENING/CLOSING SENSOR

● THERMAL SOURCE SENSOR
▲ SMOKE SENSOR
■ TEMPERATURE SENSOR

● SOUND SENSOR
▲ THERMAL SOURCE SENSOR

FIG. 15

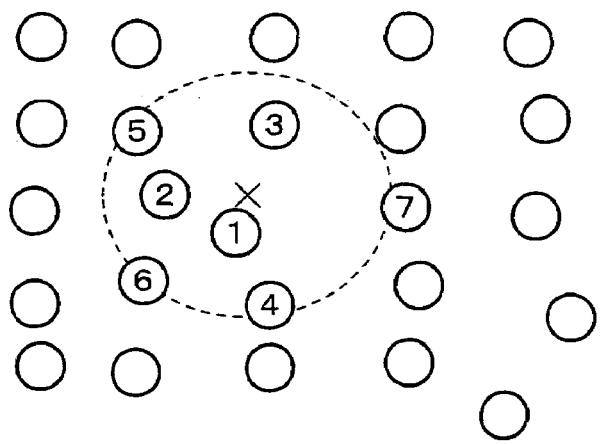

JUDGEMENT BASED ON SPACIAL DISTRIBUTION AND TIME DISTRIBUTION OF SENSING RESULTS BY MULTIPLE SENSORS (IN THE CASE OF GRADUALLY SPREADING OBJECT SUCH AS SMOKE AND TEMPERATURE IN THE EVENT OF FIRE)

NUMBERS IN CIRCLES INDICATE SENSING ORDERS.
CENTER (× MARK) OF CIRCLE FOUND BY SENSING ORDERS AND TIME DIFFERENCE IS JUDGED TO BE POSITION OF OBJECT, AND THE CENTER IS DETERMINED TO BE MOVING DESTINATION OF ROBOT.

JUDGEMENT BASED ON OUTPUT VALUES OF MULTIPLE SENSORS

POSITION OF SOUND SOURCE IS JUDGED BY RATIOS OF DISTANCE TO SOUND SOURCE, FOUND BY USING THE FACT THAT VOLUME LEVEL OF SOUND IS INVERSELY PROPORTIONAL TO SQUARE OF DISTANCE FROM SOUND SOURCE, AND THE POSITION OF SOUND SOURCE IS DETERMINED TO BE MOVING DESTINATION OF ROBOT.

INFORMATION COLLECTION APPARATUS, INFORMATION COLLECTION METHOD, INFORMATION COLLECTION PROGRAM, RECORDING MEDIUM CONTAINING INFORMATION COLLECTION PROGRAM, AND INFORMATION COLLECTION SYSTEM

TECHNICAL FIELD

The present invention relates to, in an information collection system where information corresponding to the state of the environment is collected by means of information collection apparatus including first information collection means such as sensor, for example, an information collection apparatus which collects information about the environment by using second information collection means which is fixed outside the apparatus together with the first information collection means, an information collection method, an information collection program, a recording medium containing the information collection program, and the information collection system.

BACKGROUND ART

Conventionally, a security system for sensing intrusion by a suspicious person to prevent a crime such as theft is in practical use in a place such as office, shop, and house. In this system, a plurality of fixed-position sensors (for example, infrared sensors) are installed in a room of an office and other place, and information from the fixed-position sensors are managed by a center (for example, security company). When the fixed-position sensor senses an abnormality (for example, intrusion by a suspicious person), and the information is transmitted to the center the center instructs a person in the security company to go to the place for checking.

However, the above fixed-position sensor can only sense a predetermined area with predetermined accuracy and function. Therefore, it cannot be said that monitoring accuracy is secured sufficiently. On the other hand, the usage of a fixed-position sensor with high accuracy and high function is a conceivable technique for securing monitoring accuracy. In this case, however, the cost required for the fixed-position sensor is high.

The present invention is attained to solve the above problem, and an objective of the present invention is to provide an information collection apparatus which can collect information about the environment (for example, abnormality information) with reduction of the cost required for external information collection means such as fixed-position sensor without lowering information collection accuracy (for example, monitoring accuracy), an information collection method, an information collection program, a recording medium containing the information collection program, and an information collection system.

DISCLOSURE OF INVENTION

In order to solve the above problem, in an information collection apparatus according to the present invention including: first information collection means, loaded in an apparatus main body, for collecting information corresponding to a state of an environment; and moving means for moving the apparatus main body, the information collection apparatus is characterized in that further included is movement control means for controlling the moving means so that the apparatus main body moves to a moving destination determined in accordance with information which is collected by one or more second information collection means, fixed to a predetermined position outside the apparatus main body, for collecting information corresponding to a state of an environment.

Further, in order to solve the above problem, in an information collection method according to the present invention of collecting information by means of an information collection apparatus including moving means for moving the information collection apparatus, the information collection method is characterized by including the steps of: moving a main body of the information collection apparatus to a moving destination determined in accordance with information which is collected by one or more second information collection means, fixed to a predetermined position outside the main body of the information collection apparatus, for collecting information corresponding to a state of an environment; and at the moving destination, causing first information collection means, loaded in the main body of the information collection apparatus, to collect information corresponding to a state of an environment.

Here, examples of information corresponding to the state of the environment include information on abnormality in the environment and merely information about the environment (including cases where there is no abnormality).

According to the above arrangement and method, the movement control means controls the moving means so that the apparatus main body moves to the moving destination determined in accordance with information collected by the second information collection means outside the apparatus main body. Under such a control, when the apparatus main body moves to the above moving destination, the first information collection means can collect information corresponding to the state of the environment (for example, information on abnormality in the environment) at the moving destination.

Note that, the moving destination corresponding to information collected by the second information collection means may be determined by moving destination determination means, which is provided in the apparatus main body, or may be determined by a control device, which is provided and connected so as to communicate with the apparatus main body, for managing information collected by the second information collection means.

Further, the above moving destination can be considered, when there is one second information collection means having collected information, to be the position of the second information collection means, and can be considered, when there are a plurality of second information collection means having collected information, to be the position identified in accordance with information collection possible areas, locations, collecting orders, and differences in collection time of the second information collection means.

Thus, in the above arrangement and method, information is collected by the second information collection means together with the first information collection means, so that lowering of information collection accuracy by the second information collection means, which is realized by second information collection means with comparatively low accuracy that can collect information (for example, a sensor capable of sensing only the presence or absence of abnormality), can be supplemented with the performance of the first information collection means. This makes it possible to collect information such as abnormality in the environment without lowering the accuracy even by using a second information collection means with a low accuracy obtained at a low price.

In order to solve the above problem, an information collection system according to the present invention is characterized by including the aforementioned information collection apparatus according to the present invention and one or more second information collection means, fixed to a predetermined position outside the information collection apparatus, for collecting information corresponding to the state of the environment, the information collection apparatus and the second information collection means being connected to each other so as to communicate with each other.

According to the above arrangement, it is possible that the information collection apparatus receives information collected by the second information means (for example, abnormality sensing information about the environment), the information collection apparatus judges the position of an information collecting object in accordance with the above information, and the moving destination of the apparatus main body is determined in accordance with the position thus judged. With this arrangement, it is possible that the movement control means controls the rotation means so that the apparatus main body moves to the above moving destination. That is, it is possible to realize an information collection system of collecting information by using the second information collection means together with the first information collection means.

In order to solve the above problem, an information collection system according to the present invention is characterized by including: an information collection apparatus according to the present invention, one or more second information collection means, fixed to a predetermined position outside the information collection apparatus, for collecting information corresponding to the state of the environment; and a control device including moving destination determination means for determining a moving destination of the apparatus main body in accordance with information collected by the second information collection means and providing operation instructions to the information collection apparatus so that the apparatus main body moves to the moving destination, the information collection apparatus, the second information collection means, the control device being connected to one another so as to communicate with one another.

According to the above arrangement, the control device receives information collected by the second information means (for example, abnormality sensing information about the environment), and the moving destination determination means in the control device determined the moving destination of the apparatus main body in accordance with the above information. Then, the moving destination determination means provides operation instructions to the information collection apparatus so that the apparatus main body moves to the above moving destination. This enables the movement control means of the information collection apparatus to control the moving means so that the apparatus main body moves to the above moving destination, and enables to realize an information collection system of collecting information corresponding to the state of the environment.

For a fuller understanding of the nature and advantages of the invention, reference should be made to the ensuing detailed description taken in conjunction with the accompanying drawings.

BRIEF DESCRIPTION OF DRAWINGS

FIG. 3 is an explanatory view showing sensing capabilities of the fixed-position sensors making up the monitoring system with respect to sensing objects.

FIG. 4 is an explanatory view showing sensing capability of a robot sensor loaded in the robot with respect to sensing objects.

FIG. 15 is an explanatory view showing one example of spacial distribution and time distribution of sensing results of the fixed-position sensors (distribution showing sensing orders).

BEST MODE FOR CARRYING OUT THE INVENTION

One embodiment of the present invention will be described below with reference to the attached drawings.

(1. System Configuration)

Figure 2:
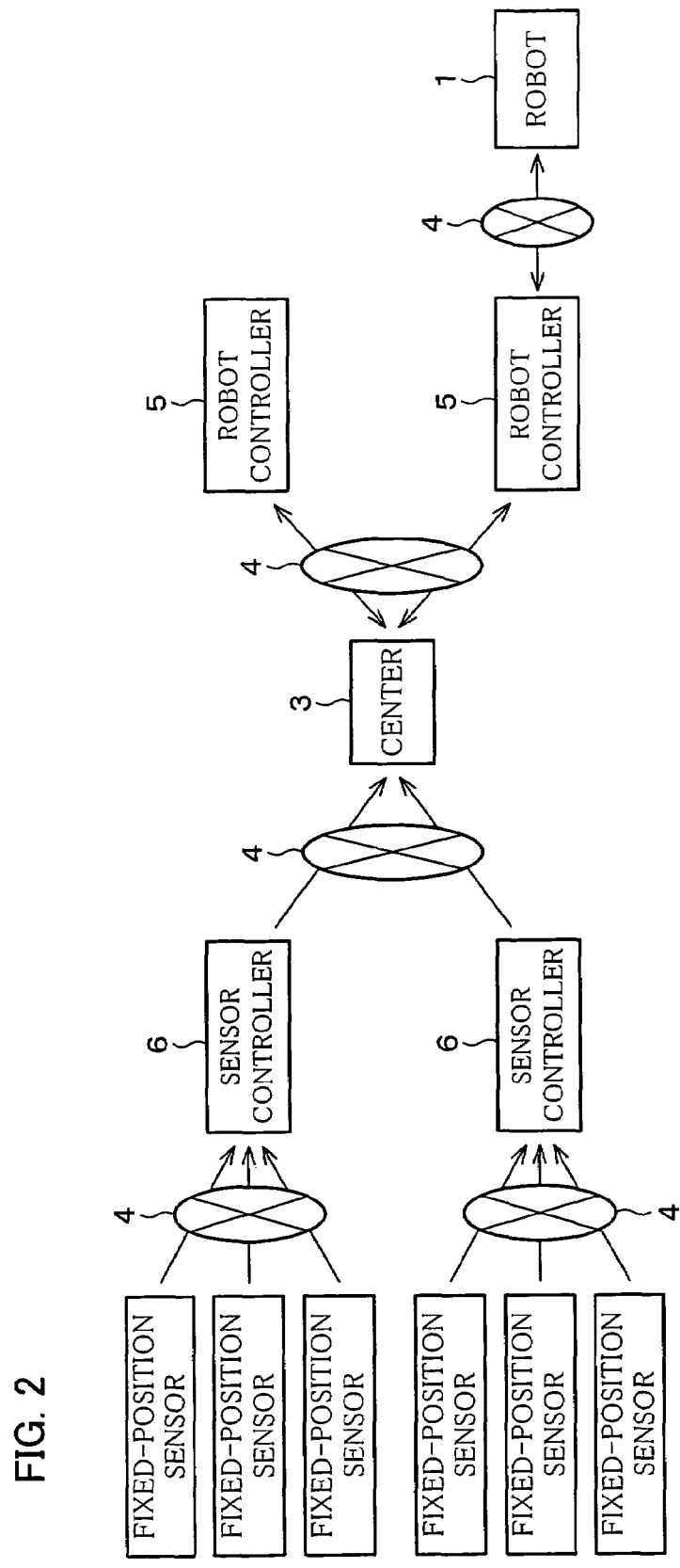
FIG. 2 is an explanatory view showing a schematic configuration of the monitoring system.

FIG. 2 shows a schematic configuration of a monitoring system as an information collection system according to the present invention. The present monitoring system has a robot 1 (information collection apparatus), fixed-position sensors 2, and a center 3 (control device).

The robot 1 is an apparatus that has manipulation function and/or movement function operated under automatic control and can perform various operations in accordance with programs. For example, the robot 1 is set at places where abnormality is to be monitored (office, shop, house, etc.). The robot 1 of the present embodiment, having both of the manipulation function and the movement function, can monitor an abnormality in the environment while moving. Therefore, the robot 1 can be also referred to as moving and monitoring robot. Note that, a configuration of the robot 1 will be described later.

Note that, for the arrangement of the present monitoring system, the robot 1 may be one or more in number. Furthermore, when the robots 1 are used in plurality, the robots 1 may be equal to or different from each other in function and performance. When the robots 1 are used in plurality, the robots 1 can share the burden of monitoring the monitoring area. Moreover, when the robots 1 are used in plurality, information exchanges can be performed among the robots 1, and missing information (information that cannot be sensed) can be compensated for from other robot 1.

The fixed-position sensors 2 are fixed to predetermined positions outside the robot 1 (for example, wall and ceiling in an office room) and sense an abnormality within the predetermined area. In the present embodiment, as shown in FIG. 2, although the fixed-position sensors 2 are used in plurality, it may be one as a matter of course. Information sensed by the fixed-position sensors 2 is transmitted to the robot 1 via the center 3 or transmitted directly to the robot 1.

Moreover, the fixed-position sensor 2 also has a function as second information collection means for not only collecting an abnormality in the environment, but also collecting information corresponding to the state of the environment (merely information about the environment).

The fixed-position sensor 2 is realized, for example, by any one or the combinations of the following sensors: sound sensor, vibration sensor, thermal source sensor, mobile object sensor, smoke sensor, light sensor, air pressure sensor, temperature sensor, opening/closing sensor, and gas sensor. These sensors are described below.

The sound sensor senses the presence or absence of sound that is higher than a certain level of volume. The vibration sensor senses the presence or absence of vibration that is higher than a certain level of vibration. The thermal source sensor senses an object with temperature that is higher than a certain level of temperature by using infrared rays or the like. The mobile object sensor senses the presence or absence of a mobile object by making use of the Doppler effect or the like of ultrasonic wave, electromagnetic wave, or other wave.

The smoke sensor senses the presence or absence of smoke. The light sensor senses the presence or absence of light that is higher than a certain level of brightness. The air pressure sensor senses the presence or absence of change in air pressure that is higher than a certain level of air pressure. The temperature sensor senses a temperature that is higher than a certain level of temperature. The opening/closing sensor senses opening/closing of doors, windows, and others. The gas sensor senses the presence or absence of inflammable gases.

Here, FIG. 3 shows sensing capabilities of the fixed-position sensors 2 with respect to sensing objects. For example, the sound sensor can react sensitively to a lying person and a fire and can react more sensitively to a suspicious person, an animal, breaking of glasses, partial damage of a building, and falling of equipment and machinery. Further, the sound sensor can react most sensitively to a loud sound caused by explosion and others. Meanwhile, the thermal source sensor can react more sensitively to explosion and can react most sensitively to a suspicious person, a lying person, a fire, and overheating of machinery and other equipment. Therefore, as can be seen from FIG. 3, each of the fixed-position sensors 2 previously has the sensing capability corresponding to a sensing object.

In the present embodiment, for the sake of preventing cost increases of a system caused by the use of a plurality of fixed-position sensors 2, used for the fixed-position sensor 2 is a sensor having comparatively low capability, low accuracy, and single function for sensing only the presence or absence of abnormality, as described above. However, the fixed-position sensor 2 may be a sensor that outputs information quantitatively varied depending on the extent of abnormality (for example, data corresponding to the volume of sound sensed).

The center 3 intensively manages information transmitted from the fixed-position sensors 2, judges the presence or absence of abnormality in accordance with the above information, and provides instructions to the robot 1 in accordance with a judgment result. Note that, the configuration of the center 3 will be described later.

The aforementioned robot 1 and the center 3 are connected to each other via communication means 4 and a robot controller 5 so that they can communicate with each other. Further, the fixed-position sensor 2 and the center 3 are connected to each other via the communication means 4 and the sensor controller 6 so that they can communicate with each other.

The communication means 4 can be realized by any of the following means: ① wire interconnection (including fixed public telephone network); ② radio waves (including mobile public telephone network); ③ low power radio and weak radio waves; ④ power line overlapping; ⑤ light (visible light, infrared rays, laser, and the like); and ⑥ ultrasonic waves.

Especially, as to the robot 1, communications by the means ② or ③ are preferable, and as to the fixed-position sensor 2, communications by the means ③ are preferable. As to the center 3, communications by the means ① and ② are preferable. As to the robot controller 5 and the sensor controller 6, communications by the means ① through ③ are preferable.

The robot controller 5 and the sensor controller 6, which have communication relaying function, can also have functions of assembling and judging transmitted information. The robot controller 5 and the sensor controller 6, although provided separately in FIG. 2, may be realized by one controller having the functions of the robot controller 5 and the sensor controller 6.

In addition, it may be arranged such that the center 3 and the robot 1 directly communicate with each other via the communication means 4, without using the robot controller 5, and it may be arranged such that the fixed-position sensor 2 and the center 3 directly communicate with each other via the communication means 4, without using the sensor controller 6. Furthermore, it may be arranged such that the fixed-position sensor 2 communicates with the center 3 via other fixed-position sensor 2, the fixed-position sensor 2 directly communicates with the robot 1 without using the center 3, and the sensor controller 6 directly communicates with the robot 1.

(2. Configuration of Robot)

Figure 1:
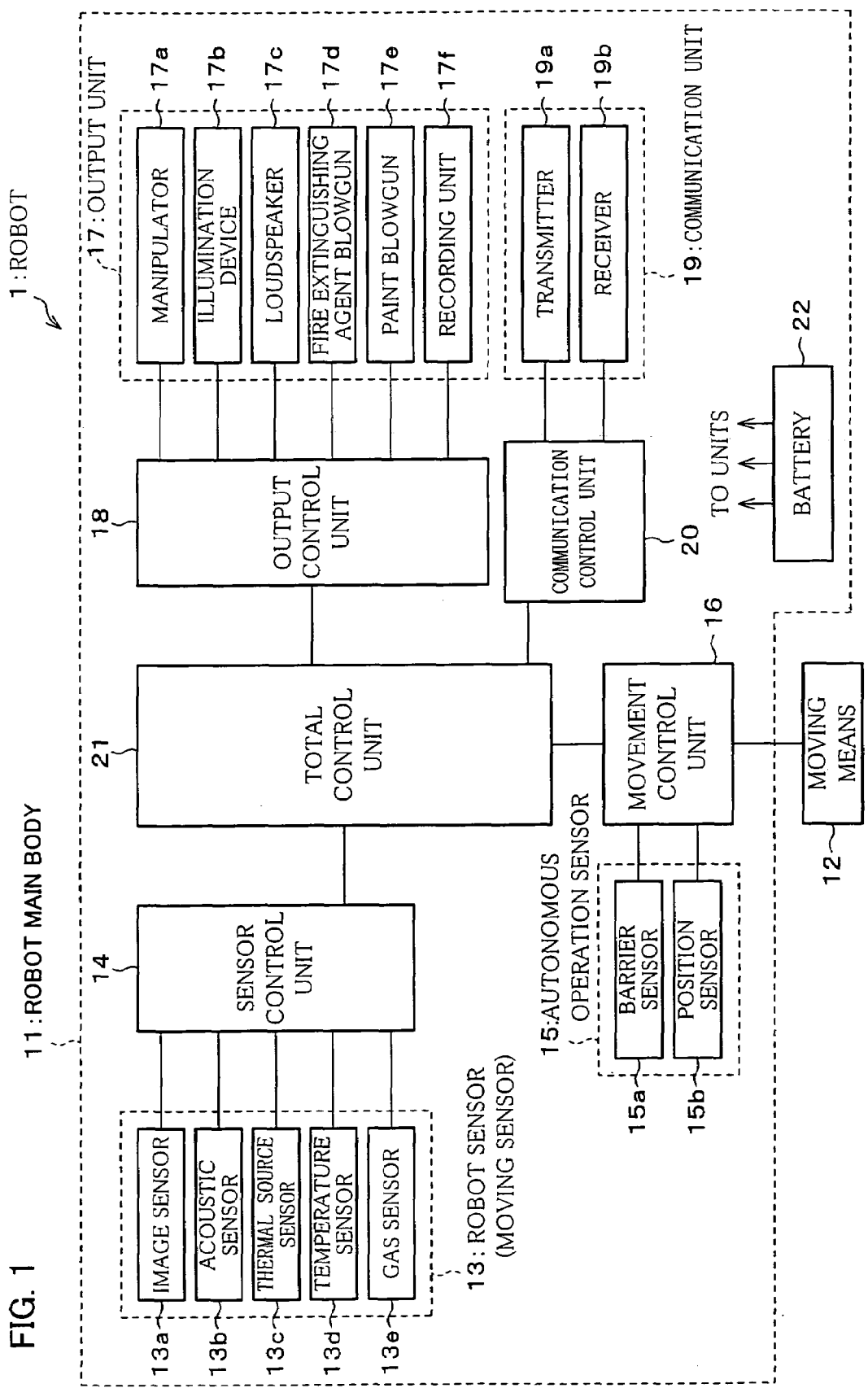
FIG. 1 is a block diagram showing a schematic configuration of a robot making up a monitoring system as an information collection system according to the present invention.

Next, a configuration of the aforementioned robot 1 will be described. FIG. 1 schematically shows a configuration of the robot 1. The robot 1, as shown in FIG. 1, includes a robot main body 11 (apparatus main body) and moving means 12.

The moving means 12, which is means for moving or rotating the robot main body 11, are composed of, for example, tires, belts (for example, Caterpillar®), mechanical walking means, and their drive means. Note that, it may be arranged such that rails are provided in an area where the robot main body 11 moves, and the moving means 12 is realized by rollers running on the rails and their drive means so that the moving means 12 causes the robot main body 11 to move along the rails.

The robot main body 11, which is a central part of the robot 1, is loaded with a robot sensor 13, a sensor control unit 14, an autonomous operation sensor 15, a movement control unit 16 (movement control means), an output unit 17, an output control unit 18, a communication unit 19, a communication control unit 20, a total control unit 21, and a battery 22.

The robot sensor 13, which is a sensor that senses an abnormality around the robot main body 11, can sense an abnormality in the environment at the moving destination to which the apparatus main body 11 moves with the moving means 12. That is, with the movement of the robot main body 11 with the moving means 12, the robot sensor 13 can obtain information on various places. In the present embodiment, since the robot main body 11 moves with the moving means 12, the robot sensor 13, which is loaded in the robot main body 11, is also referred to as mobile sensor.

Further, robot sensor 13 also has a function as first information collection means for collecting not only abnormality in the environment, but also information corresponding to the state of the environment (merely information about the environment).

The robot sensor 13 has, for example, an image sensor 13a, an acoustic sensor 13b, a thermal source sensor 13c, a temperature sensor 13d, and a gas sensor 13e. The image sensor 13a is a kind of monitoring camera that measures the size of an object, senses the type of the object, and senses whether or not the object moves. The acoustic sensor 13b measures the volume of sound and senses the type of the sound. The thermal source sensor 13c measures the temperature of thermal source. The temperature sensor 13d measures temperature. The gas sensor 13e senses the type of gas and measures concentrations of the gas.

Here, FIG. 4 shows sensing capability of the robot sensor 13 with respect to sensing objects. For example, the image sensor 13a can sense intrusion by a suspicious person by sensing a mobile object about the size of human. The acoustic sensor 13b can sensor a fire by sensing the sound of burning. Further, the thermal source sensor 13c can sense a suspicious person, a lying person, and an animal by sensing a thermal source with a temperature near body temperature (approximately 36° C.), and can sense a fire, overheating of machinery and other equipment, and explosion by sensing a thermal source with a high temperature (approximately 50° C.).

Thus, the robot sensor 13 is sophisticated and highly accurate in function and performance as a sensor so that the robot sensor 13 can sense information that the fixed-position sensor 2 cannot sense in detail. Moreover, the robot sensor 13 can sense an abnormality in the environment when the robot main body 11 just rotates on the spot without moving. Therefore, the robot sensor 13 is said to previously have higher sensing capability corresponding to a sensing object than that of the fixed-position sensor 2.

The sensor control section 14 controls the operation of the robot sensor 13, assemble information sensed by the robot sensor 13, and transmit it to the total control unit 21.

The autonomous operation sensor 15, which is a sensor for autonomous operation of the robot 1, is composed of a barrier sensor 15a and a position sensor 15b.

The barrier sensor 15a senses whether or not there is any barrier around the robot 1. Information sensed by the barrier sensor 15a is transmitted to the movement control unit 16, and the movement control unit 16 controls the moving means 12 so that the moving means 12 can move while evading a barrier.

The position sensor 15b senses the current location of the robot 1 and is realized by existing position sensing means utilizing GPS (Global Positioning System) and PHS® (Personal Handyphone System), for example. Information sensed by the position sensor 15b is transmitted to the total control unit 21 via the movement control unit 16, and is transmitted to the center 3, if necessary.

As described above, the movement control unit 16 controls the moving means 12 in accordance with information sensed by the autonomous operation sensor 15 and controls the moving means 12 in accordance with the control of the total control unit 12. Further, the movement control unit 16 controls the moving means 12 so that the robot main body 11 moves in accordance with information received from the external fixed-position sensors 2. This makes it possible for the robot sensor 13 to sense an abnormality in the environment at the moving destination of the robot main body 11.

The output unit 17 is an action unit for taking an external action to a sensing object (suspicious person, animal, barrier, etc.). The output unit 17 has a manipulator 17a, an illumination device 17b, a loudspeaker 17c, a fire extinguishing agent blowgun 17d, a paint blowgun 17e, and a recording unit 17f.

The manipulator 17a, which consists of multiple segments coupled to one another, is a kind of robot arm that can grab an object and move the grabbed object flexibly back and forth, up and down, and from right to left. For example, when the barrier sensor 15a senses a barrier around the robot 1, the manipulator 17a can remove the barrier. Furthermore, the manipulator 17a can move any fixed-position sensor 2 to rearrange it, and the manipulator 17a can also throw a paint ball to a suspicious person, for example.

The illumination device 17b illuminates a sensing object and is realized by halogen lamp, for example. The loudspeaker 17c outputs a warning sound and a warning message to a sensing object. The fire extinguishing agent blowgun 17d sprays a sensing object with fire extinguishing agent such as water and fire extinguishing liquid. For example, when a sensing object is burning, the fire extinguishing agent blowgun 17d extinguishes a fire promptly.

The paint blowgun 17e, when a sensing object is a suspicious person, for example, sprays the suspicious person with paint. This causes the suspicious person to become marked by the paint, which facilitates chasing of the suspicious person even when the suspicious person runs away from the spot.

The recording unit 17f records as data information received from the fixed-position sensors 2 and information obtained by the robot sensor 13. The recording unit 17f may be realized by a memory such as hard disk, RAM, and ROM or may be realized by a drive for recording data on a recording medium such as CD-R.

In the output unit 17, the illumination device 17b, the loudspeaker 17c, the fire extinguishing agent blowgun 17d, the paint blowgun 17e, and the recording unit 17f take actions in accordance with information received from the fixed-position sensors 2 and information obtained by the robot sensor 13, under the control of the total control unit 21 and the output control unit 18.

The output control unit 18 controls the operation of the output unit 17 under the control of the total control unit 21.

The communication unit 19 is an interface for communicating with an entity outside the robot 1 and is composed of a transmitter 19a and a receiver 19b. The transmitter 19a transmits to the center 3 information obtained by the robot sensor 13 and information sensed by the position sensor 15b. The receiver 19b receives information obtained by the fixed-position sensors 2 and information such as operation instructions from the center 3.

The communication control unit 20 controls the operation of the communication unit 19 under the control of the total control unit 21.

The total control unit 21 controls the operations of the units in the robot 1 in accordance with operation instructions from the center 3. Also, the total control unit 21 can control the operations of the units in the robot 1 in accordance with information sensed by the sensors inside the robot main body 11.

The battery 22 is a power source (battery) for supplying to the units power necessary to activate the above units.

(3. Configuration of Center)

Figure 5:
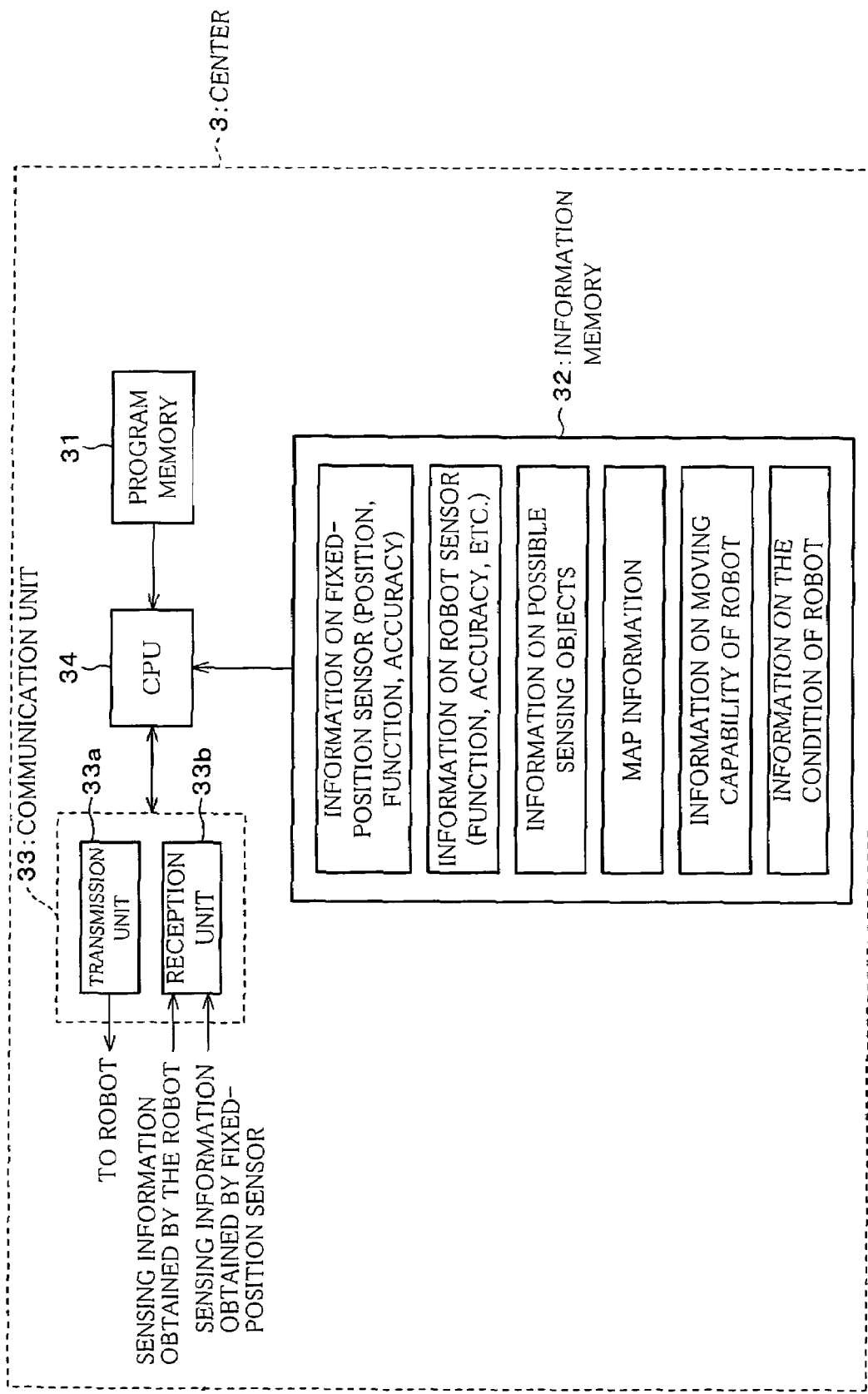
FIG. 5 is a block diagram showing a schematic configuration of a center making up the monitoring system.

Next, a configuration of the center 3 will be described below. FIG. 5 shows a schematic configuration of the center 3. The center 3, as shown in FIG. 5, includes a program memory 31, an information memory 32, a communication unit 33, and CPU (Central Processing Unit) 34.

The program memory 31 stores a program for operating the CPU 4.

The information memory 32 stores items referred to in judgment of abnormality by the CPU 34. Examples of such items include information on the fixed-position sensor 2, information on the robot sensor 13, information on possible sensing objects, map information, information on moving capability of the robot 1, and information on the condition of the robot.

Here, the information on the fixed-position sensor 2 includes information on fixed positions of the fixed-position sensors 2 and sensing capability (for example, function and accuracy) for each of the sensing objects shown in FIG. 3. The information on the robot sensor 13 includes information on sensing capability (example, function and accuracy) of the robot sensor 13 with respect to each of the sensing objects shown in FIG. 4.

The information on possible sensing objects indicates information on sensing objects that could be possibly sensed by the fixed-position sensors 2 and the robot sensor 13, including, for example, a suspicious person, a lying person, an animal, a fire, overheating of machinery and other equipment, explosion, breaking of glasses, damage of a building, falling of equipment and machinery, and gas leakage, shown in FIG. 3 and FIG. 4.

Figure 6:
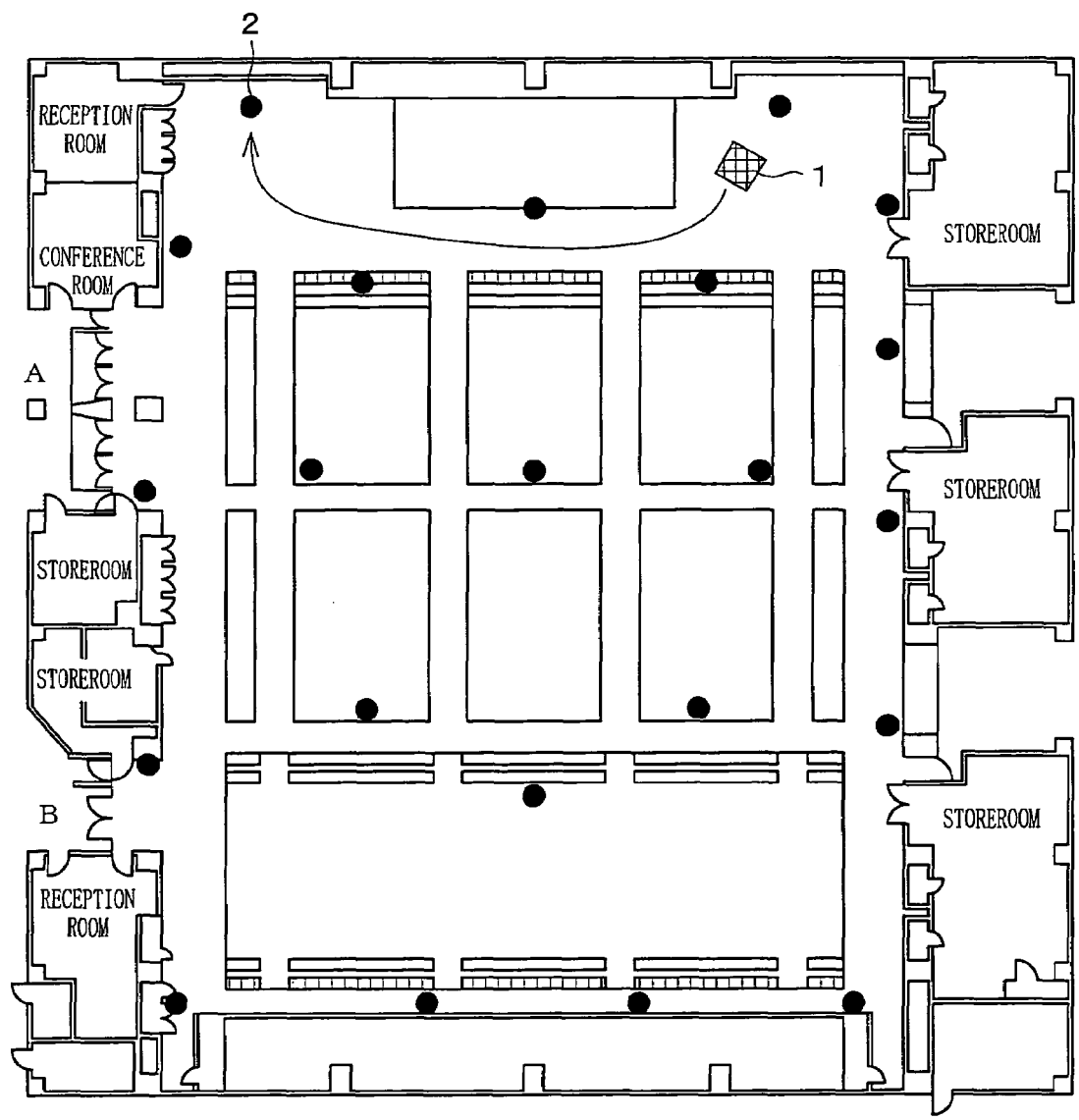
FIG. 6 is an explanatory view showing a map information of the entire floor where the robot is located.

The map information, as shown in FIG. 6, is information on a map of the entire floor where the robot 1 is located and a layout of the room where the robot 1 is located. The information on moving capability of the robot 1 includes information on a movement speed and a movement mode of the robot 1. The information on the condition of the robot 1 includes information on what kind of units in the robot sensor 13 and the output unit 17 are included in the robot 1.

The communication unit 33 is an interface for communicating with the robot 1 and the fixed-position sensor 2 and is composed of a transmission unit 33a and a reception unit 33b. The transmission unit 33a provides operation instructions to the robot 1 in accordance with a judgment result of the presence or absence of abnormality by the CPU 34. The reception unit 33b receives information sensed by the fixed-position sensors 2 and information sensed by the robot sensor 13 of the robot 1.

The CPU 34 has a function as moving destination determination means for determining a moving destination of the robot main body 11 in accordance with information from the fixed-position sensor 2 having sensed an abnormality. For example, when there is one fixed-position sensor having sensed an abnormality, the CPU 34 determines that a moving destination of the robot main body 11a is the position of the fixed-position sensor 2 having sensed abnormality, and provides operation instructions to the robot 1 so that the robot 1 moves toward the moving destination thus determined.

Moreover, the CPU 34 also has a function as sensing object judgment means for judging what a sensing object is in accordance with information sensed by the robot sensor 13. In this case, the CPU 34 provides operation instructions to the robot 1 so that the robot 1 takes an action in accordance with a judged sensing object.

(4. Operations)

Next, operations in the present monitoring system are described below. Note that, referring to the map information in FIG. 6, the following description of the present monitoring system will be given based on the cases where the center 3 intervenes and where the center 3 does not intervene. Note that, in the map information in FIG. 6, black circles denote the positions where the fixed-position sensors 2 are located.

(4-1. Operation of a System Where a Center Intervenes)

Figure 7:
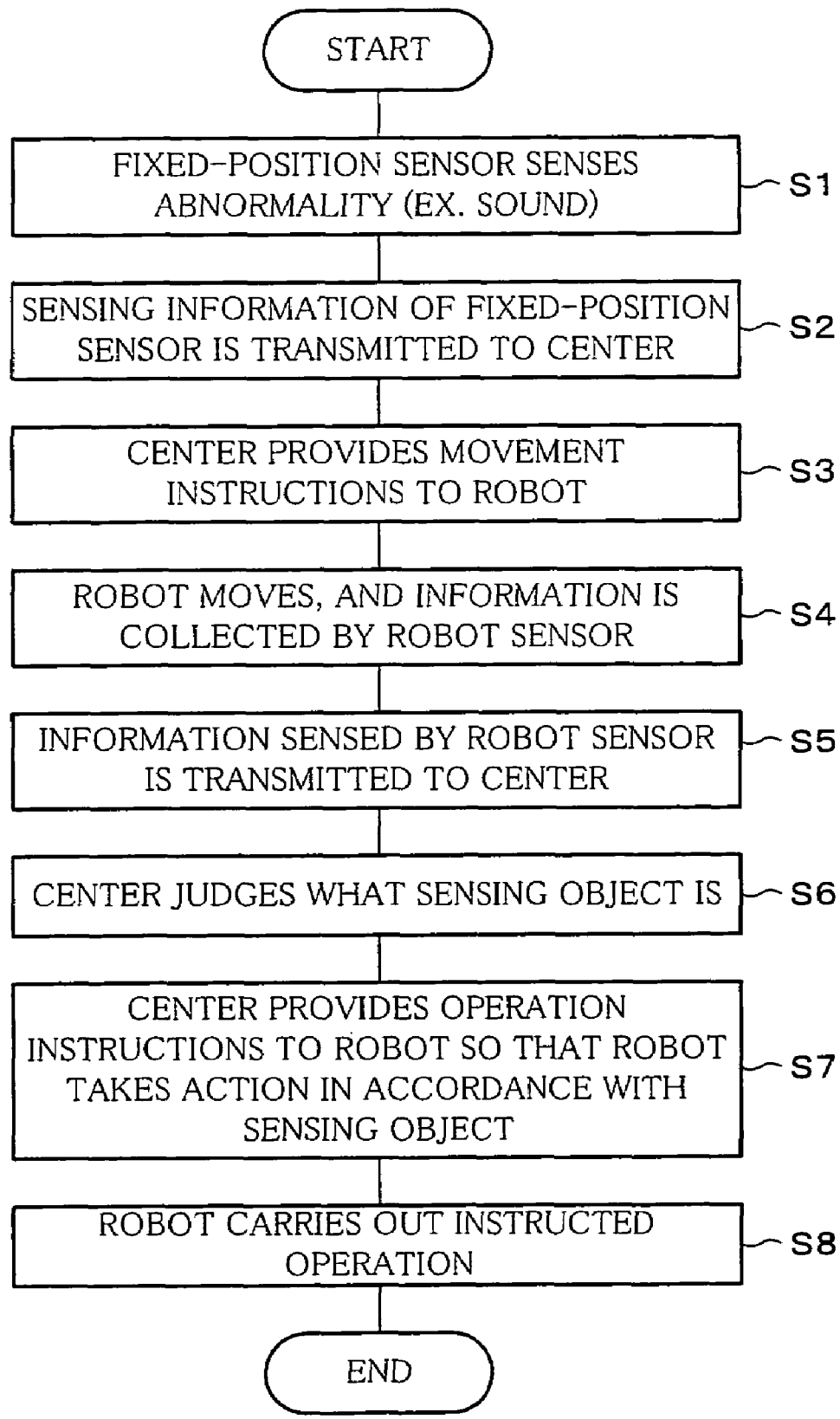
FIG. 7 is a flowchart showing a flow of the operation in the monitoring system where a center intervenes in the monitoring system.

FIG. 7 shows a flow of the operation in a monitoring system where the center 3 intervenes between the robot 1 and the fixed-position sensors 2. First, assume that any fixed-position sensor 2 (for example, sound sensor) senses a loud sound (S1). Then, information that a loud sound has been sensed is transmitted from the fixed-position sensor 2 to the center 3 (S2). The CPU 34 in the center 3, when receiving the above information, checks a position of the fixed-position sensor 2 having sensed the sound and provides movement instructions to the robot 1 so that the robot 1 moves closer to the specified fixed-position sensor 2 (S3). That is, when there is one fixed-position sensor 2 having sensed an abnormality, the CPU 34 determines a position where the fixed-position sensor 2 is located to be a moving destination of the robot 1 and provides movement instructions to the robot 1.

Note that, when there are a plurality of fixed-position sensors 2 having sensed an abnormality, it is possible to judges a position of a sensing object as well as to determine the judged position to be a moving destination of the robot main body 11, in accordance with information from the fixed-position sensors 2. A determination method in this case will be described later.

The robot 1, upon receiving the instructions, under the control of the movement control unit 13, activates the moving means 12 to move toward the fixed-position sensor 2 and makes full use of the sensors in the robot sensor 13 to collect information on abnormality (S4). Information sensed by the sensors in the robot sensor 13 is transmitted to the center 3 (S5). At this moment, image information obtained by the image sensor 13a is transmitted to the center 3 and recorded in the recording unit 17f, whatever a sensing object is.

The CPU 34 in the center 3 judges what a sensing object is in accordance with information sensed by the robot sensor 13 (S6). The robot sensor 13, as shown in FIG. 4, is higher in sensing capability than the fixed-position sensor 2, so that it is possible to largely identify a sensing object only from a sensing result by the robot sensor 13.

Note that, for example, overheating of machinery and equipment and explosion, as shown in FIG. 4, are impossible to be distinctly sensed only by the thermal source sensor 13c and the temperature sensor 13d in the robot sensor 13.

In this case, the CPU 34 can determine what a sensing object is in accordance with both of the information sensed by the fixed-position sensors 2 and the information sensed by the robot sensor 13. It is described specifically below.

The CPU 34 brings sensing capability (⊚, ○, Δ) of each of the fixed-position sensors 2 into correspondence with a point with respect to each sensing object, and points obtained by the fixed-position sensors 2 having sensed an abnormality are added up for each sensing object so that possible sensing objects are placed in the order. Then, the CPU 34 identifies a sensing object by judging from the resultant total points and a result obtained by the robot sensor 13 in a comprehensive manner. Thus, the CPU 34 can reliably identify a sensing object by using both of the information obtained by the fixed-position sensors 2 and the information obtained by the robot sensor 13.

Then, the CPU 34 provides operation instructions to the robot 1 so that the robot 1 takes an action in accordance with the identified sensing object (S7). Accordingly, the robot 1 carries out the instructed operation (S8).

More specifically, when a sensing object is determined to be a suspicious person or animal, the loudspeaker 17c emits a warning sound and a warning message to the sensing object, and the illumination device 17b illuminates the sensing object. Especially, when a sensing object is a suspicious person, the paint blowgun 17e sprays paint to the suspicious person.

Further, when a sensing object is determined to be a lying person, for example, the loudspeaker 17c calls to the person, and a communication tool (for example, portable telephone) is supplied to the person. When a sensing object is determined to be a fire, for example, the fire extinguishing agent blowgun 17d sprays water and fire extinguishing liquid to the fire on the spot, and other robot 1 having a function of extinguishing a fire rushes to the spot. When a sensing object is a fire, overheating of machinery and other equipment, explosion, breaking of glasses, damage of a building (complete collapse, partial collapse), falling of equipment and machinery, or gas leakage, communications with disaster prevention system in a room are carried out. Accordingly, in case of fire, a fire door is closed and a gas is shut off, an exhaust fan and smoke discharge system are activated. In case of overheating of machinery and other equipment, operation of this machinery is stopped. In case of gas leakage, a gas is shut off, and an exhaust fan is activated.

Note that, the CPU 34 provides the above operation instructions to the robot 1. In addition, the CPU 34 may report the occurrence of abnormality to a person of a company managing the aforementioned monitoring system so that the person rushes to the spot to check the abnormality.

As described above, in the present monitoring system, the robot main body 11 is caused to move to a moving destination which is determined in accordance with information from a fixed-position sensor having sensed an abnormality, and the robot sensor 13 senses an abnormality at the moving destination, so that when the fixed-position sensor 2 has low accuracy obtained at a comparatively low cost for sensing only the presence or absence of abnormality, decrease in monitoring accuracy of the fixed-position sensor 2 can be supplemented with the performance of the robot sensor 13.

That is, even when a sensing object cannot be judged only by the fixed-position sensor 2 due to its accuracy, the sensing object is judged in accordance with information sensed by the robot sensor 13 in such a manner that a position of the sensing object is largely identified in accordance with information from the fixed-position sensor 2, and the robot sensor 13 senses the sensing object at the moving destination of the robot main body 11.

Therefore, since abnormality is sensed by the fixed-position sensor 2 together with the robot sensor 13 in this manner, it is possible to monitor an abnormality in the environment without decrease in monitoring accuracy. Also, it can be said that it is possible to efficiently obtain information at a low cost.

That is, the present invention is one that achieves the object of sensing an abnormality in the environment in such a manner that one or more fixed-position sensors 2 that cannot move by itself or themselves and the robot sensor 13 loaded in the robot 1 moving by itself if necessary, supplement information each other.

When the center 3 intervenes between the robot 1 and the fixed-position sensor 2, the center 3 determines a moving destination of the robot 1 and judges what a sensing object is. This causes the total control unit 21 of the robot 1 to free from such functions, which decreases the load of controlling in the total control unit 21.

Further, the output unit 17 of the robot 1 takes an action in accordance with a sensing object judged by the CPU 34 of the center 3, thereby enabling minimization of damage caused by the occurrence of abnormality.

(4-2. Operation of a System Where a Center Does not Intervene)

Figure 9:
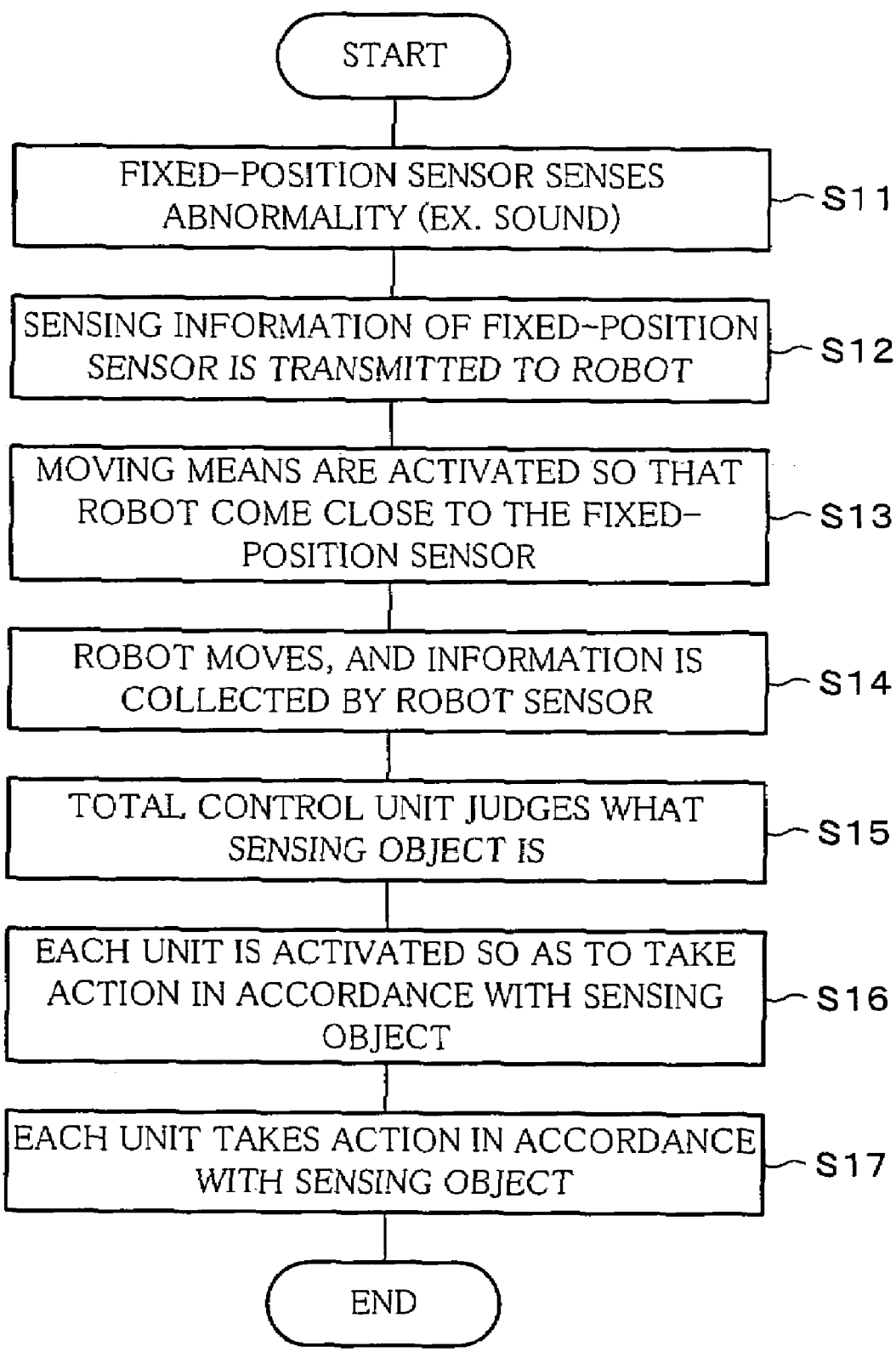
FIG. 9 is a flowchart showing a flow of the operation in the monitoring system where a center does not intervene in the monitoring system.

FIG. 9 shows a flow of the operation in a monitoring system where the center 3 does not intervene between the robot 1 and the fixed-position sensor 2, that is, a monitoring system where the fixed-position sensor 2 directly communicates with the robot 1. In this case, the total control unit 21 of the robot 1 has a function as moving destination determination means for determining a moving destination of the robot main body 11 and a function as sensing object judgment means for judging what a sensing object is in accordance with information sensed by the robot sensor 13.

First, assume that any fixed-position sensor 2 (for example, sound sensor) senses a loud sound (S11). Then, information that a loud sound has been sensed is transmitted from the fixed-position sensor 2 to the robot 1 (S12). The total control unit 21 of the robot 1 having received the above information determines a position of the fixed-position sensor 2 having sensed the sound to be the moving destination of the robot main body 11 and controls the movement control unit 16 to activate the moving means 12 so that the robot main body 11 moves to the moving destination (S13). The sensors in the robot sensor 13 collect information on abnormality in the environment at the aforementioned moving destination (S14).

The total control unit 21 judges what a sensing object is in accordance with information sensed by the sensors (S15). At the moment, as in the case of 4-1, the total control unit 21 may identify a sensing object by using both of the information obtained by the fixed-position sensors 2 and the information obtained by the robot sensor 13.

Figure 8:
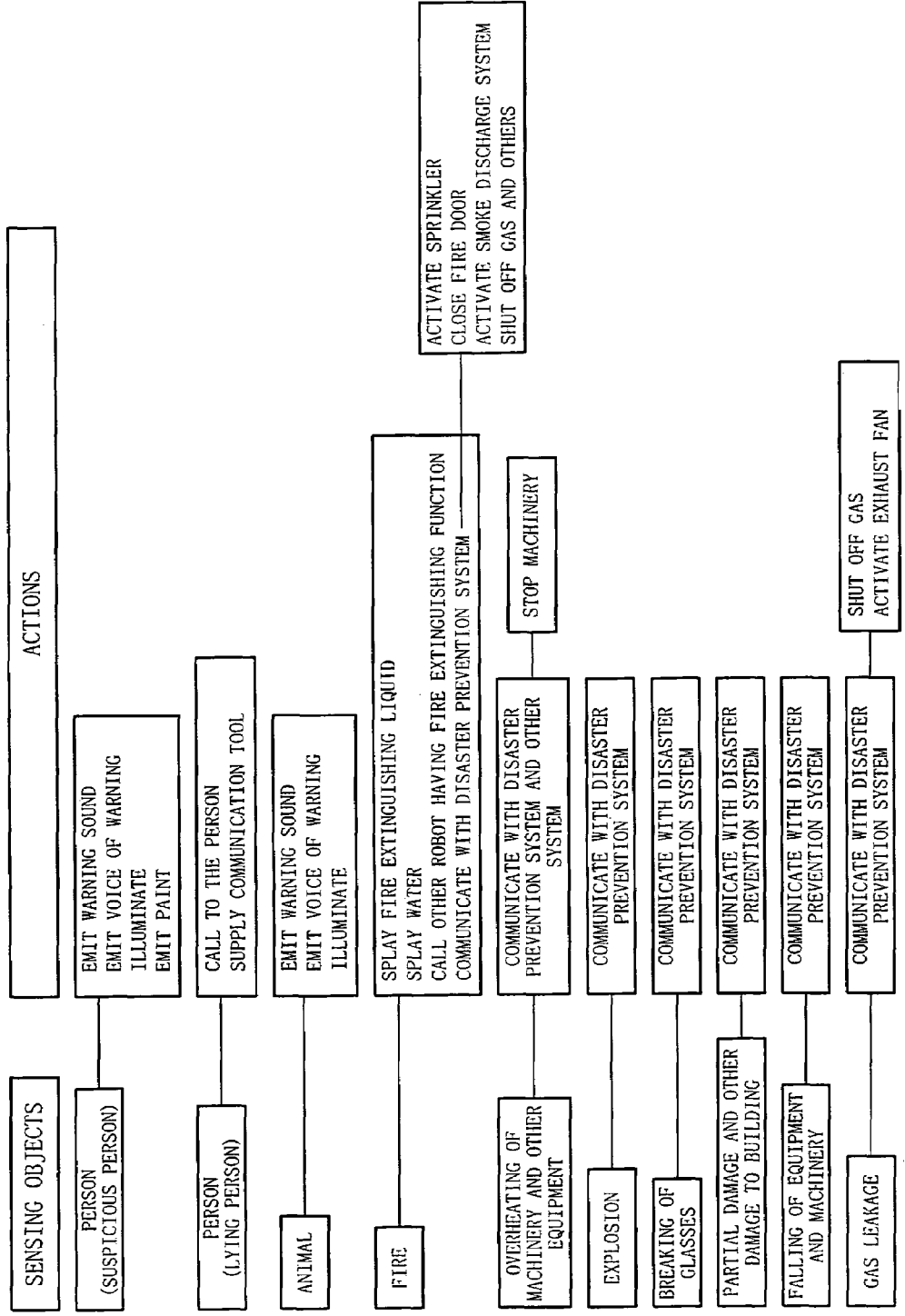
FIG. 8 is an explanatory view showing contents of actions that an output unit loaded in the robot takes in accordance with a sensing object.

Next, the total control unit 21, as shown in FIG. 8, controls the units (for example, the output unit 17 and the communication unit 19) in the robot main body 11 so that the robot 1 takes an action in accordance with the identified sensing object (S16). Accordingly, the units in the robot main body 11 performs the operation described in 4-1 (S17).

As described above, in the monitoring system where the center 3 does not intervene between the robot 1 and the fixed-position sensor 2, since abnormality is sensed by the fixed-position sensor 2 together with the robot sensor 13, as in the case of the system where the center 3 intervenes, it is possible to monitor an abnormality in the environment with reduction of the cost required for the fixed-position sensor 2 without lowering the monitoring accuracy.

Especially, in the case of the present monitoring system, a monitoring system can be realized without the center 3, so that it is possible to simplify its system configuration.

Incidentally, the above description has been given based on the monitoring system where abnormality in the environment is monitored. However, the present invention is not limited to this monitoring system. For example, the preset invention is applicable to the case where the robot sensor 13 and the fixed-position sensor 2 not only sense abnormality in the environment, but also collect information corresponding to the state of the environment (merely information about the environment).

That is, if it is arranged such that information about the environment is collected by the robot sensor 13 together with the fixed-position sensor 2, lowering of information collection accuracy by the fixed-position sensor 2, which is realized by a sensor with comparatively low accuracy that can collect information, can be supplemented with the performance of the robot sensor 13. This makes it possible to establish an information collection system where information about the environment can be collected without lowing accuracy even by using a fixed-position sensor with a low accuracy obtained at a low price.

Note that, as described above, the robot sensor 13 loaded in the robot 1 is given as an example of first information collection means for collecting information in accordance with the state of the environment, the present invention is not limited to the arrangement in which it is loaded in the robot 1.

(5. Positions of the Fixed-Position Sensors to be Located)

Incidentally, although positions of the fixed-position sensors to be set have not been especially specified in the above description, which types of the fixed-position sensors 2 to use may be decided in accordance with an object regarded as important to be sensed and a cost required for a system, so as to locate the fixed-position sensors 2.

Figure 10:
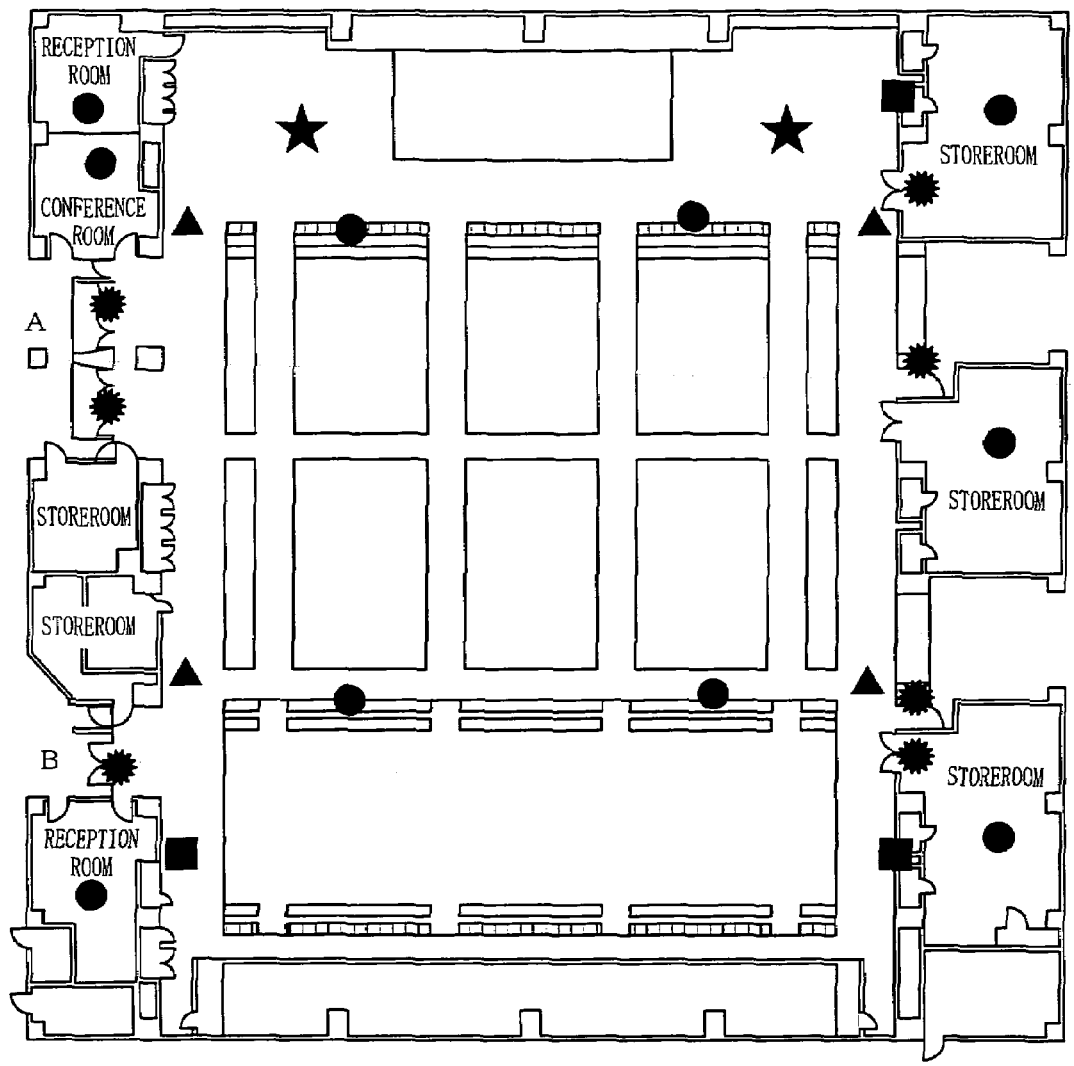
FIG. 10 is an explanatory view showing types of the fixed-position sensors and positions of the fixed-position sensors to be located in the case where intrusion by a suspicious person is regarded as important to be sensed.

FIG. 10 shows types of the fixed-position sensors 2 and positions of the fixed-position sensors 2 to be located in the case where intrusion by a suspicious person is regarded as important to be sensed, for example. As shown in FIG. 10, the sound sensors are located at silent places such as storeroom, and the thermal source sensors are located at places where a suspicious person would pass through, such as passage. In addition, the vibration sensors are located on an object which a suspicious person would move, such as cabinet, the mobile object sensors are located at relatively large places where a suspicious person would get around, and the opening/closing sensors are located at doors and windows.

Figure 11:
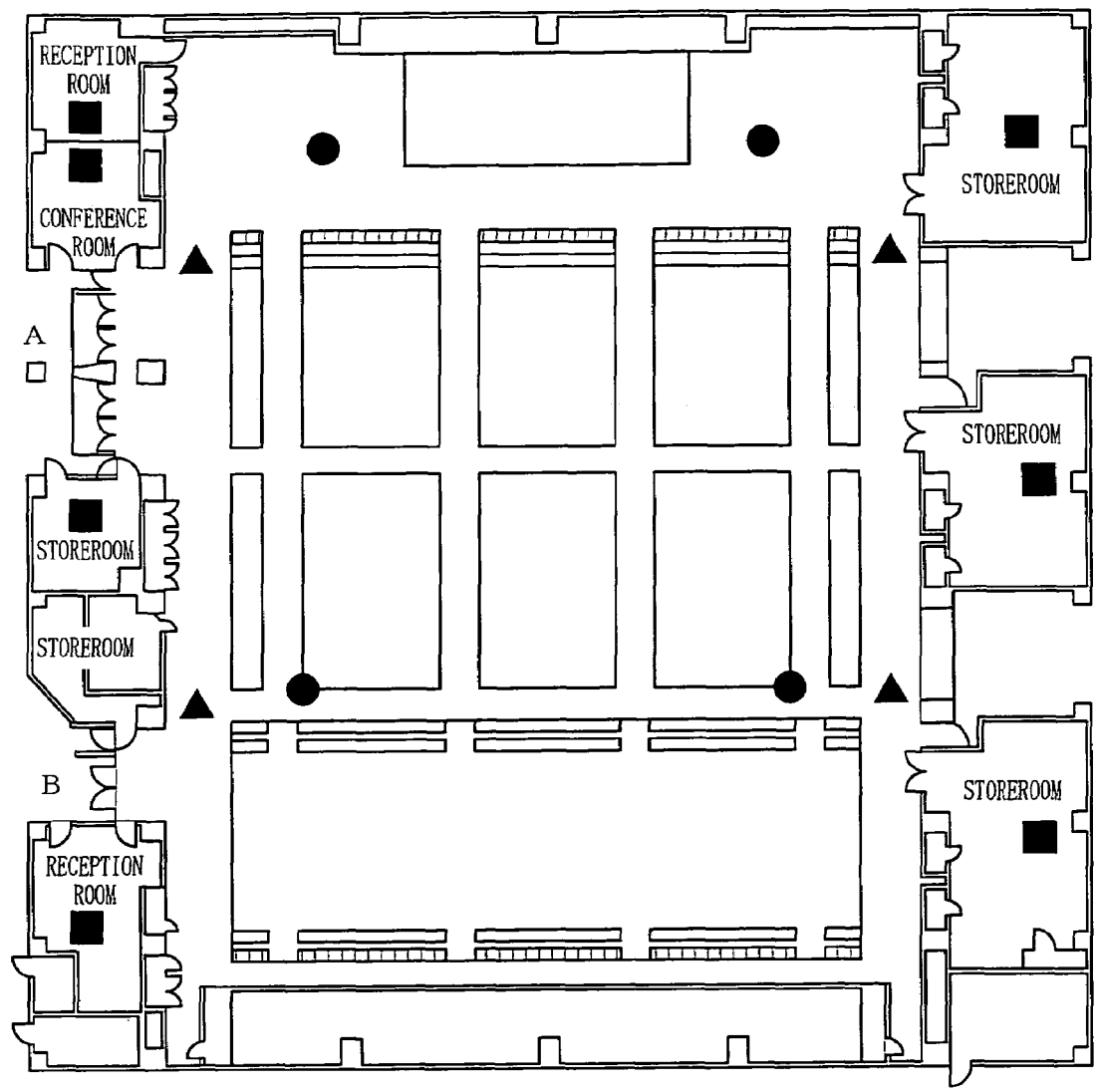
FIG. 11 is an explanatory view showing types of the fixed-position sensors and positions of the fixed-position sensors to be located in the case where a fire is regarded as important to be sensed.

Further, FIG. 11 shows types of the fixed-position sensors 2 and positions of the fixed-position sensors 2 to be located in the case where a fire is regarded as important to be sensed, for example. As shown in FIG. 11, the thermal source sensors are located at places overlooking large areas, the smoke sensors are located at places which are flow channels of smoke, and the temperature sensors are located at a machine room and other rooms.

Thus, it is possible to reliably sense a sensing object to be sensed in such a manner that which types and locations of the fixed-position sensors 2 are decided in accordance with a target to be sensed (which sensing object is regarded as important to be sensed).

Figure 12:
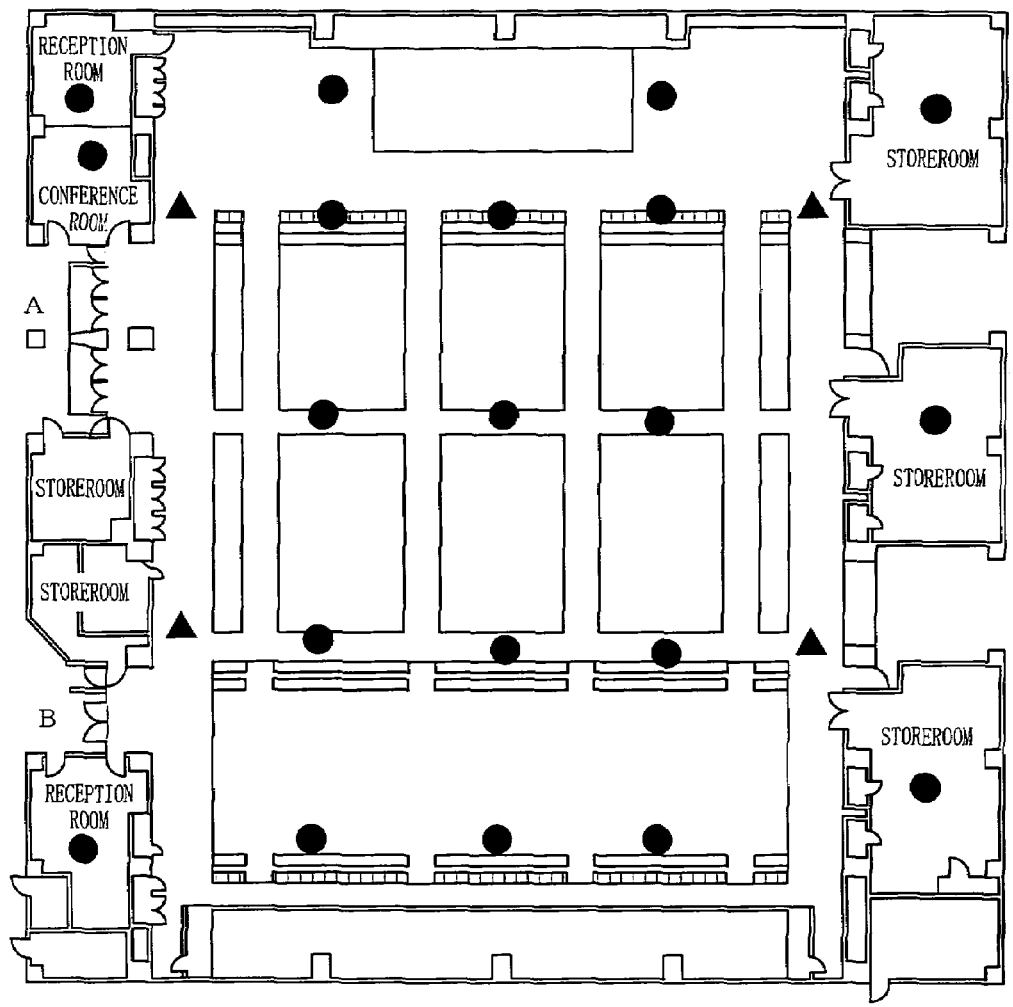
FIG. 12 is an explanatory view showing types of the fixed-position sensors and the positions of the fixed-position sensors to be located in the case where economical efficiency is regarded as important.

FIG. 12 shows types of the fixed-position sensors 2 and the positions of the fixed-position sensors 2 to be located in the case where economical efficiency is regarded as important, for example. As shown in FIG. 12, a large number of sound sensors capable of sensing a large area and low in price are located. Further, the thermal source sensors capable of sensing a large area are also located at important places. Thus, it is possible to monitor an abnormality with reduction of the cost required for all of the fixed-position sensors 2 in such a manner that which fixed-position sensors 2 to use are decided to locate the fixed-position sensors 2.

(6. Method of Determining a Moving Destination)

Next, the following will describe a method of determining a moving destination of the robot 1 in the case where there are a plurality of fixed-position sensors 2 having sensed an abnormality. By causing the robot 1 to move to a moving destination determined by this determination method, the robot sensor 13 can reliably sense a sensing object at the moving destination. Note that, the moving destination of the robot 1 may be determined by the CPU 34 in the center 3 or may be determined by the total control section 21 of the robot 1.

(6-1. A Case Where the Fixed-Position Sensors has Directivity)

Figure 13:
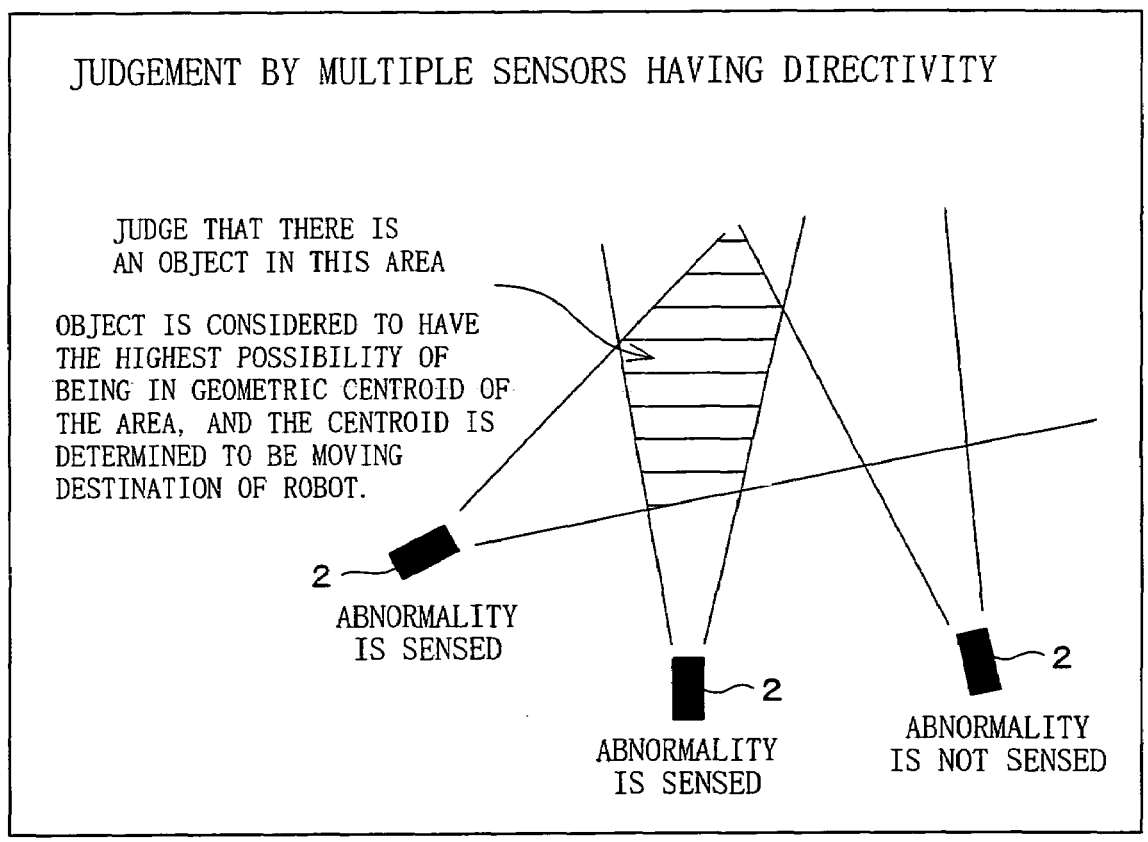
FIG. 13 is an explanatory view showing sensing possible areas of the fixed-position sensors in the case where the fixed-position sensors are realized by sensors having directivity.

In the case where the fixed-position sensors 2 are realized by sensors having directivity such as directional microphone, as shown in FIG. 13, a sensing possible area is limited depending on the fixed-position sensor 2. At this moment, when sensing possible areas of the fixed-position sensors 2 having sensed an abnormality are superposed each other in one plane, it can be considered that a sensing object has the highest possibility of being in a geometric centroid of an overlapping area.

Therefore, the CPU 34 or the total control unit 21 judges that a position of the sensing object is a centroid of the overlapping area in the sensing possible areas of the fixed-position sensors 2 having sensed an abnormality, and determines that the moving destination is the overlapping area or the centroid, whereby the robot sensor 13 can reliably sense a sensing object when the robot main body 11 moves to the moving destination as a target.

(6-2. A Case Where Only Used is a Spacial Distribution of Sensing Results by the Fixed-Position Sensors)

Figure 14:
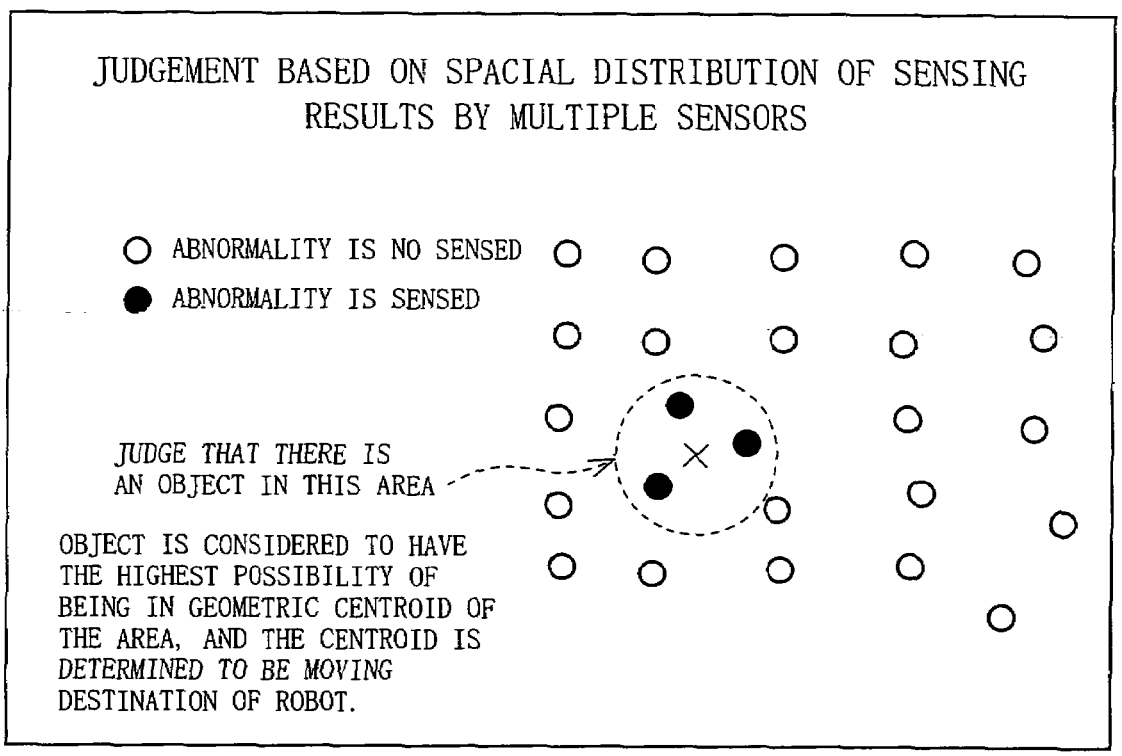
FIG. 14 is an explanatory view showing spacial distribution of sensing results by the fixed-position sensors (distribution of the positions where the fixed-position sensors having sensed an abnormality and the fixed-position sensors not having sensed an abnormality are located).

The following description assumes that the fixed-position sensors 2 are realized by sound sensor and thermal source sensor, for example, and are located at the positions of white circles and black circles in FIG. 14. Note that, the white circle indicates the position of the fixed-position sensor 2 not having sensed an abnormality, and the black circle indicates the position of the fixed-position sensor 2 having sensed an abnormality.

In this case, assuming that there is a circle including chords that are straight lines connecting the black circles, it can be considered that a sensing object has the highest possibility of being a geometric center in this circle including only the fixed-position sensors 2 having sensed an abnormality. Therefore, the CPU 34 or the total control unit 21 judges that a position of the sensing object is a center of the spacial distribution of the fixed-position sensors 2 having sensed an abnormality, that is, a center of the circle containing only the fixed-position sensors 2 having sensed an abnormality, and determines that the moving destination is the position thus judged, whereby the robot sensor 13 can reliably sense a sensing object when the robot main body 11 moves to the moving destination as a target.

(6-3. A Case Where Spacial Distribution of Sensing Results by the Fixed-Position Sensors Gradually Changes with the Passage of Time)

The following description assumes that the fixed-position sensors 2 are realized by temperature sensor and smoke sensor, for example, and are located at the positions of white circles in FIG. 15. Note that, numbers in the white circles indicate orders in which the fixed-position sensors 2 have sensed an abnormality.

For example, flames and smoke occurring during a fire gradually spread almost concentrically with the passage of time. Therefore, the spacial distribution of the sensing results by the fixed-position sensors 2 also gradually change with the passage of time. In such a case, the CPU 34 or the total control unit 21 identify a position of the sensing object in accordance with orders in which the fixed position sensors 2 have sensed an abnormality and differences in abnormality sensing time between the fixed position sensors 2, and determines that the position thus identified is the moving destination of the robot main body 11.

This method makes it possible to largely identify a position of the sensing object even when spacial distribution of sensing results by the fixed-position sensors 2 gradually changes with the passage of time, so that the robot sensor 13 can reliably sense the sensing object when the robot main body 11 moves to this position as a destination.

(6-4. A Case Where Special Distribution of Sensing Results by the Fixed-Position Sensors Changes with the Passage of Time)

Figure 16:
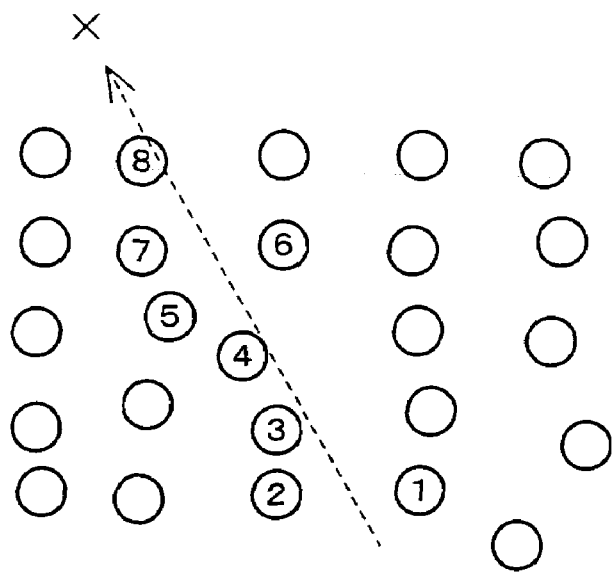
FIG. 16 is an explanatory view showing another example of spacial distribution and time distribution of sensing results of the fixed-position sensors.

The following description assumes that the fixed-position sensors 2 are realized by thermal source sensor, for example, and are located at the positions of white circles in FIG. 16. Note that, numbers in the white circles indicate orders in which the fixed-position sensors 2 have sensed an abnormality.

For example, when a suspicious person intrudes into a room and moves in one direction, spacial distribution of sensing results by the fixed-position sensors 2 sensing the suspicious person changes in one direction with the lapse of time. In such a case, the CPU 34 or the total control unit 21 estimates a movement direction and a movement speed of the sensing object and estimates the position where the sensing object would be after a lapse of a predetermined time, in accordance with orders in which the fixed-position sensors 2 has sensed an abnormality and differences in abnormality sensing time between the fixed position sensors 2, and then the estimated position is determined to be the moving destination of the robot main body 11.

This method makes it possible to largely identify a position of the sensing object even when spacial distribution of sensing results by the fixed-position sensors 2 gradually changes in one direction with the passage of time, so that the robot sensor 13 can reliably sense the sensing object when the robot main body 11 moves to this position as a destination after a lapse of a predetermined time.

(6-5. A Case Where the Fixed-Position Sensors Output Quantitative Data)

Generally, a volume level of sound, which is quantitative data, is inversely proportional to square of distance from a sound source. In this connection, when the fixed-position sensors 2 are realized by sound sensor outputting sound volume level, ratios of distance from the fixed-position sensors 2 to a sound source can be found in accordance with sound volume level outputted from the fixed-position sensors 2.

Figure 17:
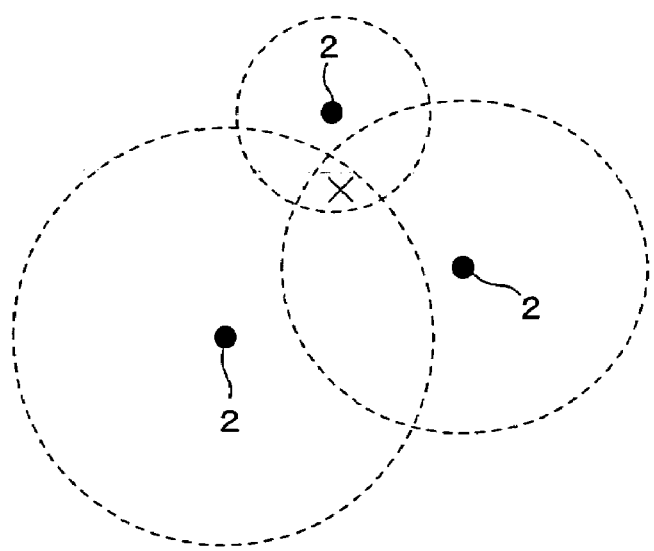
FIG. 17 is an explanatory view showing a positional relation between the fixed-position sensors and a sensing object (sound source) which is identified in accordance with output values from the fixed-position sensors.

Here, FIG. 17 shows ratios of distance from the fixed-position sensors 2 to the sound source respectively brought into correspondence to radii of circles. The CPU 34 or the total control unit 21 finds ratios of distance to the sound source in accordance with sound volume levels which have been sensed by the fixed-position sensors 2, as described above, identify a position of the sound source, which is a sensing object, to be a position where ratios of distance from the fixed-position sensors 2 are largely in balance (a center of an overlapping part in the circles), and determines the position thus identified to be a moving destination of the robot main body 11. This makes it possible for the robot sensor 13 to reliably sense the sensing object when the robot main body 11 moves to this position as a destination.

(7. Another Example of the Information Collection Apparatus)

As an example of an information collection apparatus, the robot 1 having manipulator function has been given in the above description. However, the information collection apparatus is not limited to the robot 1. That is, the information collection apparatus of the present invention can be realized by a terminal apparatus without the manipulator 17*a* as in the robot 1, provided that the terminal apparatus has sensor function.

Further, that the moving means 12 moves the robot main body 11 has been given as an example in the above description. An objective of the present invention can be achieved by the arrangement in which the moving means 12 causes the robot main body 11 to rotate without changing the position of the robot main body 11.

That is, the present invention may be arranged such that the robot 1 is located somewhere in a floor and a room where an abnormality is to be sensed, and when the fixed-position sensor 2 senses an abnormality in the environment, the moving means 12 functions as rotation means for rotating the robot main body 11 so that a position of a sensing object determined in accordance with information from the fixed-position sensor 2 having sensed an abnormality falls within a sensing area of the robot sensor 1.

Note that, it is safe that the position of the sensing object is determined by the total control unit 21 of the robot 1 or the CPU 34 of the center 3 in accordance with information from the fixed-position sensor 2 having sensed an abnormality. In the arrangement in which the CPU 34 determines the position of the sensing object, the CPU 34 provides operation instructions so as to rotate the robot main body 11 so that such a position falls within a sensing area of the robot sensor 13.

Thus, the arrangement in which the robot main body 11 is rotated by the moving means 12 under the control of the total control unit 21 or the CPU 34 causes the position of the sensing object to fall within a sensing area of the robot sensor 13, so that the robot sensor 13 can reliably sense the sensing object within the sensing area.

Therefore, since such an arrangement enables sensing of abnormality with the use of the fixed-position sensor 2 together with the robot sensor 13, lowering of monitoring accuracy by the fixed-position sensor 2, which is realized by sensor with comparatively low accuracy that senses only the presence or absence of abnormality, can be supplemented with the performance of the robot sensor 13. As a result of this, the above arrangement can also obtain the effect of the present invention that an abnormality in the environment can be monitored with reduction of the cost required for the fixed-position sensor 2 without lowering the monitoring accuracy.

(8. Program and Recording Medium)

The operations by the robot 1 and the center 3 described above can be realized by a program. This program is stored in a computer-readable recording medium. In the present invention, this recording medium may be a memory (not shown) which is necessary to perform operations by the robot 1 (for example, ROM itself) and may be a program memory 31 in the center 3. Alternatively, the recording medium may be program media that are readable by inserting a recording medium into the intermediary of a program reading device (not shown) as external storage device.

For any of the above recording media, a stored program may be executed by access of a microprocessor (not shown), or the stored program may be executed in such a manner that the stored program is read out, and the read program is downloaded to a program storage area (not shown). In this case, the description above assumes that a program for downloading is stored in advance in the main body apparatus.

Here, the program media, which are recording media that can be detachable from a main body, may be media solidly holding a program, including tapes such as magnetic tapes and cassette tapes, disks including magnetic disks such as Floppy® disks and hard disks and optical disks such as CD-ROM, MO, MD, and DVD, cards such as IC cards (including memory cards) and optical cards, and semiconductor memories such as mask ROM, EPROM, EEPROM, and flash ROM.

Further, in the present invention, a system has a configuration capable of connection with a communication network including Internet, so that a medium fluidly holding a program in such a way of downloading a program via the communication network may be adopted. Note that, when a program is downloaded from the communication network in this manner, a program for downloading is stored in advance in the main body apparatus or may be installed from another recording medium.

Note that, the contents stored in the recording medium, not limited to a program, may be data.

As described above, an information collection system according to the present invention is arranged so as to include an information collection apparatus according to the present invention and one or more second information collection means, fixed to a predetermined position outside the information collection apparatus, for collecting information corresponding to the state of the environment, the information collection apparatus and the second information collection means being connected to each other so as to communicate with each other.

Also, an information collection system according to the present invention is arranged so as to include: an information collection apparatus according to the present invention, one or more second information collection means, fixed to a predetermined position outside the information collection apparatus, for collecting information corresponding to the state of the environment; and a control device including moving destination determination means for determining a moving destination of the apparatus main body in accordance with information collected by the second information collection means and providing operation instructions to the information collection apparatus so that the apparatus main body moves to the moving destination, the information collection apparatus, the second information collection means, the control device being connected to one another so as to communicate with one another.

Further, an information collection system according to the present invention may be arranged such that the second information collection means is fixed-position sensor for sensing an abnormality in the environment.

According to the above arrangement, the fixed-position sensor as the second information collection means is used together with the first information collection means of the information collection apparatus, whereby it is possible to establish a monitoring system of monitoring an abnormality in the environment as an information collection system.

Still further, an information collection system according to the present invention may be arranged such that the moving destination determination means in the control device, when there is one fixed-position sensor having sensed an abnormality, determine that the moving destination is the position where the fixed-position sensor having sensed an abnormality is located.

When there is one fixed-position sensor having sensed an abnormality, an information collecting object (sensing object) is considered to be in the vicinity of this fixed-position sensor. In the above arrangement, the moving destination determination means determines that the moving destination is a position where the fixed-position sensor having an abnormality is located. Therefore, when the information collection apparatus moves to the above moving destination, there is high possibility that the apparatus main body is located near the sensing object, and the first information collection means can reliably sense the sensing object.

Yet further, an information collection system according to the present invention may be arranged such that the moving destination determination means in the control device, when there are a plurality of fixed-position sensors having sensed an abnormality, determine that the moving destination is the overlapping part in respective sensing possible areas of the fixed-position sensors having sensed an abnormality.

According to the above arrangement, the moving destination determination means determines that the moving destination is an overlapping part in the respective sensing possible areas of the plurality of fixed-position sensors. With this arrangement, when the information collection apparatus moves to the above moving destination as a target, the first information collection means can reliably sense the sensing object.

Note that, such a method of determining a moving destination is effective in the case where a plurality of fixed-position sensors are realized by sensors having directivity such as directional microphone, for example, and the respective sensing possible areas of the fixed-position sensors are limited.

Further, an information collection system according to the present invention may be arranged such that the moving destination determination means in the control device, when there are a plurality of fixed-position sensors having sensed an abnormality, determine that the moving destination is a center of a circle containing only the fixed-position sensors in two-dimensional location distribution of the fixed-position sensors.

In the case where there are a plurality of fixed-position sensors having sensed an abnormality, considering two-dimensional location distribution of the fixed-position sensors, the sensing object has the high possibility of being in the center of the circle containing only these plural fixed-position sensors. In the above arrangement, the moving destination determination means determines that the moving destination is the center of the circle containing only the fixed-position sensors having sensed an abnormality. Therefore, when the information collection apparatus moves to the above moving destination as a target, the first information collection means can reliably sense the sensing object.

Still further, an information collection system according to the present invention may be arranged such that the moving destination determination means in the control device, when there are a plurality of fixed-position sensors having sensed an abnormality, judge a position of a sensing object by finding respective distances from the fixed-position sensors having sensed the abnormality to the sensing object in accordance with output values being outputted from the fixed-position sensors and varying depending on an extent of abnormality, and determine that the position thus judged is the moving destination of the apparatus main body.

According to the above arrangement, the moving destination determination means judges the position of the sensing object in accordance with output values being outputted from the plurality of fixed-position sensors having sensed an abnormality and varying depending on an extent of abnormality. For example, when the fixed-position sensor is a sound sensor that senses sound and outputs its sound volume level, it is possible to find ratios of distance from the fixed-position sensors to a sound source, which is a sensing object, based on the sound volume level outputted from the fixed-position sensors, by using the fact that sound volume level is inversely proportional to the square of distance from a sound source, and this ratios makes it possible to judge the position of the sensing object.

Therefore, the moving destination determination means determines that the position thus judged of the sensing object is the moving destination of the information collection apparatus, so that when the information collection apparatus moves to the above moving destination as a target, the first information collection means can reliably sense the sensing object.

Yet further, an information collection system according to the present invention may be arranged such that the control device further includes sensing object judgment means for judging what a sensing object of the fixed-position sensor is in accordance with information collected by the first information collection means in the information collection apparatus.

According to the above arrangement, the sensing object judgment means in the control device judge what the sensing object is in accordance with information sensed by the first information collection means, so that the information collection apparatus need not include means corresponding to the sensing object judgment means. As a result of this, it is possible to simplify a configuration of the information collection apparatus.

Further, an information collection system according to the present invention may be arranged such that the control device further includes sensing object judgment means for judging what a sensing object of the fixed-position sensor is in accordance with information collected by the first information collection means in the information collection apparatus and information sensed by the fixed-position sensor.

According to the above arrangement, the sensing object judgment means judges what the sensing object is in accordance with information collected by the first information collection means and information sensed by the fixed-position sensor. Therefore, for example, even when it is difficult to judge and identify the sensing object only with information from the first information collection means, it is possible to reliably judge what the sensing object is, considering information sensed by the fixed-position sensor.

Still further, an information collection system according to the present invention may be arranged such that the information collection apparatus further includes action means for taking an action corresponding to a sensing object judged by the sensing object judgment means.

According to the above arrangement, the action corresponding to the sensing object judged by the sensing object judgment means in the control device is taken by the action means of the information collection apparatus. Here, examples of the action corresponding to the sensing object include, when the sensing object is a suspicious person, the action of emitting warning sound and splaying paint by the action means, and when the sensing object is a fire, the action of splaying fire extinguishing liquid and water by the action means. Therefore, by taking such actions respectively corresponding to sensing objects (intimidation of the suspicious person, prompt fire fighting, etc.), it is possible to minimize damage caused by the occurrence of abnormality.

Yet further, an information collection system according to the present invention may be arranged such that the sensing object judgment means, when a plurality of the fixed-position sensors comprise different types of sensors, bring sensing capability of each of the fixed-position sensors into correspondence with a point with respect to each sensing object, add points obtained by fixed-position sensors having sensed an abnormality for each sensing object, and judge what a sensing object is in accordance with resultant total points and information obtained by the first information collection means.

According to the above arrangement, for judgment of the sensing object by using both information from the first information collection means and information from the fixed-position sensor, the sensing object judgment means judge the sensing object in view of sensing capabilities of the fixed-position sensors. With this arrangement, even when the sensing capabilities of each of the fixed-position sensors vary depending on the sensing object, it is possible to judge what the sensing object is in view of such a variation and to enhance accuracy of sensing object judgment.

Further, an information collection system according to the present invention may be arranged such that a plurality of the fixed-position sensors are provided, and which types and locations of the fixed-position sensors are decided in accordance with a target to be sensed.

According to the above arrangement, for a plurality of fixed-position sensors, which types and locations of the fixed-position sensors are decided in accordance with a target to be sensed (which sensing object is regarded as important to be sensed). With this arrangement, the fixed-position sensors can reliably sense the sensing object to be sensed.

Still further, an information collection apparatus according to the present invention may be arranged so as to include first information collection means, loaded in an apparatus main body, for collecting information corresponding to a state of an environment, wherein further included is rotation means, when information corresponding to a state of an environment by one or more second information collection means which is fixed to a predetermined position outside the apparatus main body, for rotating the apparatus main body in accordance with information collected by the second information collection means.

According to the above arrangement, the apparatus main body is rotated by the rotation means in accordance with information from the second information collection means (for example, abnormality sensing information). With this arrangement, for example, when the apparatus main body is rotated so that the sensing object is included within information collection area of the first information collection means, the first information collection can reliably collect information on the sensing object.

Note that, the position of the sensing object may be identified by, for example, position determination means, which is provided in the apparatus main body, or may be identified by the control device, which is provided and connected so as to communicate with the apparatus main body, for managing information collected by the second information collection means.

Moreover, the position of the sensing object can be largely considered, when there is one second information collection means having collected information (having sensed an abnormality), to be the position of the second information collection means, and can be considered, when there are a plurality of second information collection means having collected information, to be the position of the sensing object identified in accordance with information collection possible areas, locations, collecting orders, and differences in collection time of the second information collection means.

Thus, in the above arrangement, information is collected by the second information collection means together with the first information collection means, so that lowering of information collection accuracy by the second information collection means, which is realized by second information collection means with comparatively low accuracy that can collect information (for example, a sensor capable of sensing only the presence or absence of abnormality), can be supplemented with the performance of the first information collection means. This makes it possible to collect information such as abnormality in the environment without lowering the accuracy even by using a second information collection means with a low accuracy obtained at a low price.

Further, an information collection system according to the present invention may be arranged so as to include the information collection apparatus and one or more second information collection means, fixed to a predetermined position outside the information collection apparatus, for collecting information corresponding to a state of an environment, the information collection apparatus and the second information collection means being connected to each other so as to communicate with each other.

According to the above arrangement, it is possible that the information collection apparatus receives information collected by the second information means (for example, abnormality sensing information), the information collection apparatus judges the position of the sensing object in accordance with the above information, and the rotation means rotates the apparatus main body in accordance with the thus judged position of the sensing object. This makes it possible to realize an information collection system of collecting information about the environment by using the second information collection means together with the first information collection means.

Still further, an information collection system according to the present invention may be arranged so as to include: the information collection apparatus; one or more second information collection means, fixed to a predetermined position outside the information collection apparatus, for collecting information corresponding to a state of an environment; and a control device for providing operation instructions to the information collection apparatus so that rotation means of the information collection apparatus rotate the apparatus main body in accordance with information collected by the second information collection means, the information collection apparatus, the second information collection means, and the control device being connected to one another so as to communicate with one another.

According to the above arrangement, the control device provides operation instructions to the information collection apparatus so that the rotation means of the information collection apparatus rotate the apparatus main body in accordance with information collected by the second information collection means (for example, abnormality sensing information). This makes it possible to realize an information collection system of collecting information about the environment by using the second information collection means together with the first information collection means.

Note that, when the second information collection means is realized by fixed-position sensor, it can be said an information collection apparatus according to the present invention may have the following arrangement.

That is, an information collection apparatus according to the present invention may be arranged so as to further include moving destination determination means which, when there is one fixed-position sensor having sensed an abnormality, determine that the moving destination is a position where the fixed-position sensor having sensed an abnormality is located.

Further, an information collection apparatus according to the present invention may be arranged so as to further include moving destination determination means which, when there are a plurality of fixed-position sensors having sensed an abnormality, determines that the moving destination is an overlapping part in respective sensing possible areas of the fixed-position sensors.

Still further, an information collection apparatus according to the present invention may be arranged so as to further include moving destination determination means which, when there are a plurality of fixed-position sensors having sensed an abnormality, determines that the moving destination is a center of a circle containing only the fixed-position sensors in two-dimensional location distribution of the fixed-position sensors.

Yet further, an information collection apparatus according to the present invention may be arranged so as to further include moving destination determination means which, when there are a plurality of fixed-position sensors having sensed an abnormality, judges a position of a sensing object by finding respective distances from the fixed-position sensors having sensed the abnormality to the sensing object in accordance with output values being outputted from the fixed-position sensors and varying depending on an extent of abnormality, and determine that the position thus judged is the moving destination of the apparatus main body.

Further, an information collection apparatus according to the present invention may be arranged so as to further include: sensing object judgment means for judging what a sensing object having been sensed by the fixed-position sensor is in accordance with information collected by the first information collection means; and action means for taking an action corresponding to the sensing object judged by the sensing object judgment means.

Still further, an information collection apparatus according to the present invention may be arranged so as to further include: sensing object judgment means for judging what a sensing object is in accordance with information collected by the first information collection means of the information collection apparatus and information sensed by the fixed-position sensor; and action means for taking an action corresponding to the sensing object judged by the sensing object judgment means.

Yet further, an information collection apparatus according to the present invention may be arranged such that the sensing object judgment means, when a plurality of the fixed-position sensors comprise different types of sensors, bring sensing capability of each of the fixed-position sensors into correspondence with a point with respect to each sensing object, add points obtained by fixed-position sensors having sensed an abnormality for each sensing object, and judge what a sensing object is in accordance with resultant total points and information obtained by the first information collection means.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The present invention is applicable to a security system which, in a place such as office, shop, and house, for example, senses intrusion by a suspicious person to prevent a crime such as theft and senses fire, gas leakage, occurrence of abnormality in various machinery, occurrence of damage and falling of various equipment, and others.

The invention claimed is:

1. An information collection apparatus comprising:
   first information collection means, loaded in an apparatus main body, for collecting information corresponding to a state of an environment; and
   moving means for moving the apparatus main body, the information collection apparatus characterized in that further included is movement control means for controlling the moving means so that the apparatus main body moves to a moving destination determined in accordance with information which is collected by one or more second information collection means, fixed to a predetermined position outside the apparatus main body, for collecting information corresponding to a state of an environment, and the movement control means determines the moving destination of the apparatus main body in accordance with the number of second information collection means having sensed an abnormality in an environment.

2. An information collection method of collecting information by means of an information collection apparatus including moving means for moving the information collection apparatus, the information collection method characterized by comprising the steps of:
   (a) moving a main body of the information collection apparatus to a moving destination determined in accordance with information which is collected by one or more second information collection means, fixed to a predetermined position outside the main body of the information collection apparatus, for collecting information corresponding to a state of an environment; and
   (b) at the moving destination, causing first information collection means, loaded in the main body of the information collection apparatus, to collect information corresponding to a state of an environment,
wherein:
   in the step (b), the moving destination of the apparatus main body is determined in accordance with the number of second information collection means having sensed an abnormality in an environment.

3. An information collection program of realizing an information collection method of collecting information by means of an information collection apparatus including moving means for moving the information collection apparatus, the information collection program characterized by causing a computer to execute the steps of:
   moving a main body of the information collection apparatus to a moving destination determined by information which is collected by one or more second information collection means, fixed to a predetermined position outside the main body of the information collection apparatus, for collecting information corresponding to a state of an environment; and
   at the moving destination, causing first information collection means, loaded in the main body of the information collection apparatus, to collect information corresponding to a state of an environment,
wherein:
   in the step of moving the main body of the information collection apparatus, the moving destination of the apparatus main body is determined in accordance with the number of second information collection means having sensed an abnormality in an environment.

4. A computer readable recording medium containing an information collection program of realizing an information collection method of collecting information by means of an information collection apparatus including moving means for moving the information collection apparatus, the information collection program characterized by causing a computer to execute the steps of:
   moving a main body of the information collection apparatus to a moving destination determined by information which is collected by one or more second information collection means, fixed to a predetermined position outside the main body of the information collection apparatus, for collecting information corresponding to a state of an environment; and
   at the moving destination, causing first information collection means, loaded in the main body of the information collection apparatus, to collect information corresponding to a state of an environment,
wherein:
   in the step of moving the main body of the information collection apparatus, the moving destination of the apparatus main body is determined in accordance with the number of second information collection means having sensed an abnormality in an environment.

5. An information collection system characterized by comprising:
   an information collection apparatus including: first information collection means, loaded in an apparatus main body, for collecting information corresponding to a state of an environment; and moving means for moving the apparatus main body, wherein further included is movement control means for controlling the moving means so that the apparatus main body moves to a moving destination determined in accordance with information which is collected by one or more second information collection means, fixed to a predetermined position outside the apparatus main body, for collecting information corresponding to a state of an environment, and the movement control means determines the moving destination of the apparatus main body in accordance with the number of second information collection means having sensed an abnormality in an environment; and one or more second information collection means, fixed to a predetermined position outside the information collection apparatus, for collecting information corresponding to a state of an environment, the information collection apparatus and the second information collection means being connected to each other so as to communicate with each other.

6. An information collection system characterized by comprising:

an information collection apparatus including: first information collection means, loaded in an apparatus main body, for collecting information corresponding to a state of an environment; and moving means for moving the apparatus main body, wherein further included is movement control means for controlling the moving means so that the apparatus main body moves to a moving destination determined in accordance with information which is collected by one or more second information collection means, fixed to a predetermined position outside the apparatus main body, for collecting information corresponding to a state of an environment;

one or more second information collection means, fixed to a predetermined position outside the information collection apparatus, for collecting information corresponding to a state of an environment; and a control device including moving destination determination means for determining a moving destination of the apparatus main body in accordance with information collected by the second information collection means and providing operation instructions to the information collection apparatus so that the apparatus main body moves to the moving destination, the information collection apparatus, the second information collection means, and the control device being connected to one another so as to communicate with one another, wherein:

the moving destination determination means determines the moving destination of the apparatus main body in accordance with the number of second information collection means having sensed an abnormality in an environment.

7. The information collection system according to claim 6, wherein:

the second information collection means is a fixed-position sensor for sensing an abnormality in an environment.

8. The information collection system according to claim 7, wherein:

the moving destination determination means in the control device, when there is one fixed-position sensor having sensed an abnormality, determine that the moving destination is a position where the fixed-position sensor having sensed the abnormality is located.

9. The information collection system according to claim 7, wherein:

the moving destination determination means in the control device, when there are a plurality of fixed-position sensors having sensed an abnormality, determine that the moving destination is an overlapping part in respective sensing possible areas of the fixed-position sensors having sensed the abnormality.

10. The information collection system according to claim 7, wherein:

the moving destination determination means in the control device, when there are a plurality of fixed-position sensors having sensed an abnormality, determines that the moving destination is a center of a circle containing only the fixed-position sensors having sensed the abnormality in two-dimensional location distribution of the fixed-position sensors.

11. The information collection system according to claim 7, wherein:

the moving destination determination means in the control device, when there are a plurality of fixed-position sensors having sensed an abnormality, judges a position of a sensing object by finding respective distances from the fixed-position sensors having sensed the abnormality to the sensing object in accordance with output values being outputted from the fixed-position sensors and varying depending on an extent of abnormality, and determine that the position thus judged is the moving destination of the apparatus main body.

12. The information collection system according to claim 7 wherein:

the control device further includes sensing object judgment means for judging what a sensing object of the fixed-position sensor is in accordance with information collected by the first information collection means in the information collection apparatus.

13. The information collection system according to claim 12, wherein:

the information collection apparatus further includes action means for taking an action corresponding to the sensing object judged by the sensing object judgment means.

14. The information collection system according to claim 7, wherein:

the control device further includes sensing object judgment means for judging what a sensing object of the fixed-position sensor is in accordance with information collected by the first information collection means in the information collection apparatus and information sensed by the fixed-position sensor.

15. The information collection system according to claim 14, wherein:

the sensing object judgment means, when a plurality of the fixed-position sensors comprise different types of sensors, brings sensing capability of each of the fixed-position sensors into correspondence with a point with respect to each sensing object, add points obtained by fixed-position sensors having sensed an abnormality for each sensing object, and judge what a sensing object is in accordance with resultant total points and information obtained by the first information collection means.

16. The information collection system according to claim 7, wherein:

a plurality of the fixed-position sensors are provided, and which types and locations of the fixed-position sensors are decided in accordance with a target to be sensed.

17. An information collection apparatus including first information collection means, loaded in an apparatus main body, for collecting information corresponding to a state of an environment, the information collection apparatus characterized in that further included is rotation means, when information corresponding to a state of an environment by one or more second information collection means which is fixed to a predetermined position outside the apparatus main body, for rotating the apparatus main body in accordance with information collected by the second information collection means.

18. An information collection system characterized by comprising:

an information collection apparatus including first information collection means, loaded in an apparatus main body, for collecting information corresponding to a state of an environment, wherein further included is rotation means, when information corresponding to a state of an environment by one or more second information collection means which is fixed to a predetermined position outside the apparatus main body, for rotating the apparatus main body in accordance with information collected by the second information collection means; and one or more second information collection means, fixed to a predetermined position outside the information collection apparatus, for collecting information corresponding to a state of an environment, the information collection apparatus and the second information collection means being connected to each other so as to communicate with each other.

19. An information collection system characterized by comprising:

an information collection apparatus including first information collection means, loaded in an apparatus main body, for collecting information corresponding to a state of an environment, wherein further included is rotation means, when information corresponding to a state of an environment by one or more second information collection means which is fixed to a predetermined position outside the apparatus main body, for rotating the apparatus main body in accordance with information collected by the second information collection means;

one or more second information collection means, fixed to a predetermined position outside the information collection apparatus, for collecting information corresponding to a state of an environment; and a control device providing operation instructions to the information collection apparatus so that the rotation means of the information collection apparatus rotates the apparatus main body in accordance with information collected by the second information collection means, the information collection apparatus, the second information collection means, and the control device being connected to one another so as to communicate with one another.

* * * * *